(12) United States Patent
Fuller

(10) Patent No.: US 12,150,438 B2
(45) Date of Patent: Nov. 26, 2024

(54) FLUID APPLICATION DEVICE

(71) Applicant: Darrell Lee Fuller, Beckley, WV (US)

(72) Inventor: Darrell Lee Fuller, Beckley, WV (US)

( * ) Notice: Subject to any disclaimer, the term of this patent is extended or adjusted under 35 U.S.C. 154(b) by 0 days.

(21) Appl. No.: 18/251,243

(22) PCT Filed: Nov. 1, 2021

(86) PCT No.: PCT/US2021/072160
§ 371 (c)(1),
(2) Date: May 1, 2023

(87) PCT Pub. No.: WO2022/094627
PCT Pub. Date: May 5, 2022

(65) Prior Publication Data
US 2023/0404058 A1    Dec. 21, 2023

(51) Int. Cl.
*A01M 21/04*   (2006.01)
*B05C 17/035*  (2006.01)

(52) U.S. Cl.
CPC ....... *A01M 21/043* (2013.01); *B05C 17/0352* (2013.01)

(58) Field of Classification Search
CPC .... A01M 21/043; A01M 21/04; A01M 21/00; B05C 17/0352; B05C 17/035; B05C 17/03; B05C 17/02; B05C 17/00
See application file for complete search history.

(56) References Cited

U.S. PATENT DOCUMENTS

| | | | |
|---|---|---|---|
| 4,624,071 A | 11/1986 | Mumey | |
| 4,742,642 A | 5/1988 | Yamamoto | |
| 4,894,948 A | 1/1990 | Eubanks | |
| 5,108,036 A | 4/1992 | Gill | |
| 5,329,727 A * | 7/1994 | Dixon | A01M 21/043 15/210.1 |
| 5,499,474 A * | 3/1996 | Knooihuizen | A01M 21/043 47/1.5 |
| 5,555,673 A | 9/1996 | Smith | |
| 5,724,765 A | 3/1998 | Wegner | |
| 6,014,836 A | 1/2000 | Chester | |
| 6,367,714 B1 | 4/2002 | Smoot | |
| 6,394,681 B1 | 5/2002 | Moore | |
| 7,213,997 B1 | 5/2007 | Joyner | |
| 8,418,400 B2 | 4/2013 | Wiese-Martin et al. | |

(Continued)

FOREIGN PATENT DOCUMENTS

| | | |
|---|---|---|
| EP | 1493331 A1 | 1/2005 |
| WO | 2012003552 A1 | 1/2012 |

(Continued)

*Primary Examiner* — Christopher J. Novosad
(74) *Attorney, Agent, or Firm* — Mary-Jacq Holroyd; Johnston Holroyd

(57) ABSTRACT

An applicator (12) has a pistol grip handle (14), a trigger (16), an operative portion (22), a hollow tube (18), an articulating joint (20) disposed in the hollow tube (18) between trigger/lever (16) and operative portion (22), which has a set of separately held jaws (24 and 26) with container (28) and lid (30) disposed thereon. Jaws (24 and 26) movement is controlled by the trigger/lever (16) which is attached to the lower jaw (26) via a cable/cord (40) enclosed within the hollow tube (18). Spring straps (34) control attach the jaws (24 and 26) to the hollow shaft/tube (18).

21 Claims, 22 Drawing Sheets

(56) References Cited

U.S. PATENT DOCUMENTS

| | | | |
|---|---|---|---|
| 8,567,116 B1 | 10/2013 | Hall | |
| 8,944,709 B2 | 2/2015 | Ellsworth et al. | |
| 2008/0060261 A1* | 3/2008 | Stevenson | A01M 21/043 |
| | | | 47/1.5 |
| 2012/0093568 A1* | 4/2012 | Ellsworth | A01M 21/043 |
| | | | 222/1 |
| 2014/0137811 A1* | 5/2014 | Kovarik | A63B 47/02 |
| | | | 119/796 |
| 2017/0027154 A1* | 2/2017 | Waller | B25G 1/102 |

FOREIGN PATENT DOCUMENTS

| | | | |
|---|---|---|---|
| WO | 2013102243 A1 | 7/2013 | |
| WO | 2014110634 A1 | 7/2014 | |

\* cited by examiner

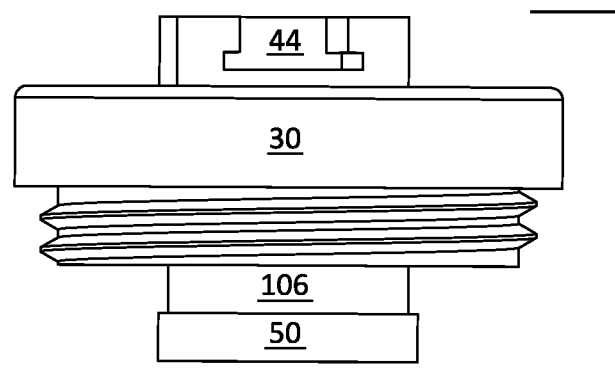
Fig. 13A
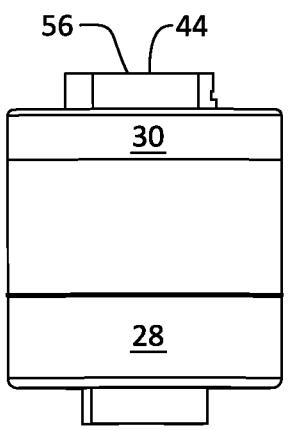
Fig. 13B
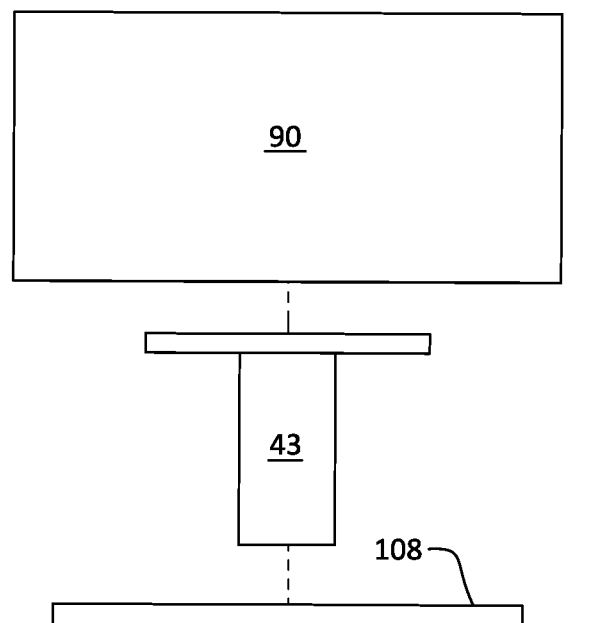
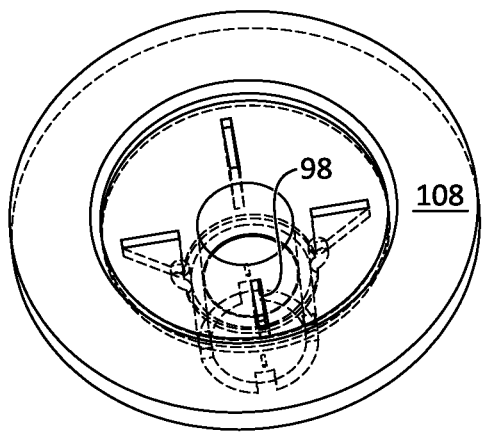
Fig. 13C
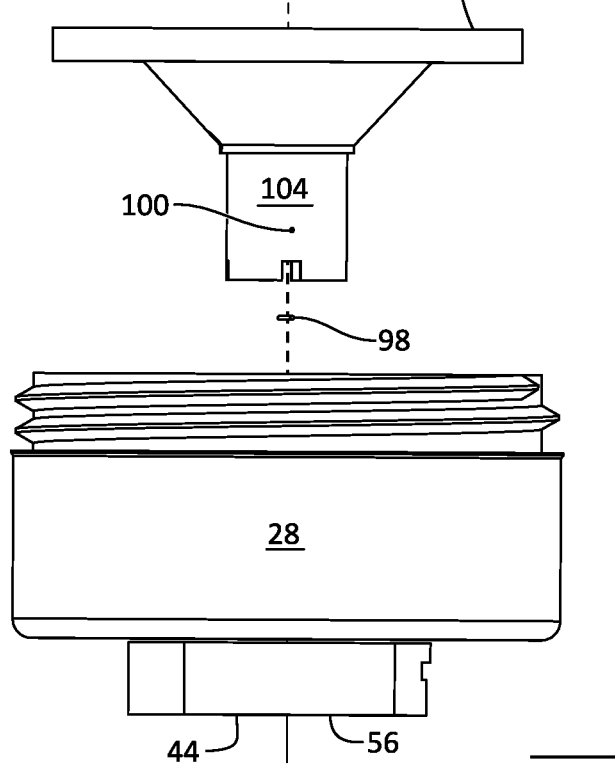

FLUID APPLICATION DEVICE

RELATED APPLICATIONS

This application claims the benefit of International Application No. PCT/US21/72160 entitled "FLUID APPLICATION DEVICE" filed on 1 Nov. 2021, which claims the benefit of U.S. Provisional Application Ser. No. 63/108,356 entitled "FLUID APPLICATION DEVICE" filed on 1 Nov. 2020, the contents of both of which are incorporated herein by reference in their entirety.

COPYRIGHT NOTICE

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Homeowners, landowners, and local, state and federal governments need to control undesirable/invasive plants and/or protect desirable plants against insect pests in yards, fields, forested areas, and especially along forest pathways and trails where broadcast spraying is not suitable. The challenge is to develop a simplistic, light weight ergonomic device easy to use and transport that can selectively apply systemic herbicide or pesticide to targeted leafy plants without affecting nearby untreated plants.

The preponderance of herbicide and pesticide sprayers have control issues in that desirable plants nearby or downwind can also be affected. Additionally, the operator needs to wear full protective clothing including eye protection, respirator, gloves besides outerwear. Overspray is inherently deleterious to surrounding animals, helpful insects and waterways as well.

Targeting and applying herbicide to only those undesirable plants has been demonstrated. Many of which appear complicated with pumps, check values, remote reservoirs, major counterweights, electric motors, and/or are too heavy to be practical and convenient. Some require two hand operation.

Those inventions that have jaws and sponges have their contact surfaces more on a vertical plane which has the propensity to allow any excess herbicide to drip without containment. They are designed principally to contact the stem or stalk. And should the leaves be contacted; the underside leaf surface is not specifically targeted. Furthermore, the applied herbicide can have "runs" down the stem or stalk contaminating the ground. Nor do many claim the flexibility to administer a pesticide.

Those inventions that have jaws and sponges have the jaws act in a scissor fashion whereby more force is likely applied closes to the pivot point thus resulting in unequal distribution of herbicide. Furthermore, these known handheld units don't allow for easy change of herbicide, especially in field applications, or when switching to a pesticide application. Additionally, it is conceivable with embodiments using needles to pierce the plant may stay attached causing the operator extra effort to dislodge the needles and separate the applicator from the plant.

For example, U.S. Pat. No. 5,724,765 teaches an herbicide applicator with vegetation grabbing jaws for applying liquid herbicide to individual weeds which has needles within a sponge purported to inject herbicide within the plant. It has a handle with a squeeze trigger for actuating pincers or grabbers at the opposing end of a length of shaft. A reservoir of herbicide is attached to the shaft. Each pincer has a plate disposed thereon which has needles projecting from it and an absorbent pad into which the needles extend. A conduit to the herbicide reservoir is provided. Upon squeezing the trigger, the pincer jaws close and the herbicide is ejected through the needles (into a plant leaf disposed between plates). This reference does not have a bend in the shaft, nor does it have a herbicide reservoir on one of the pincers.

U.S. Pat. No. 8,944,709 teaches a fluid application device including a clamp portion with two clamp arms in which at least one of the clamp arms has a sponge, a reservoir to store a fluid and a trigger to move the clamp arms towards each other when pressed a first distance and to pump fluid from the reservoir to the sponge when pressed a second distance (greater than the first). Herbicide is applied to a leaf or other item and held in place by the squeezing mechanism. US Patent Application No. 2008/0060261 teaches herbicide application apparatuses and application methods including a shaft with a clamp (or pincer) portion opposite a handle with a trigger, and a reservoir for herbicide with tubing to deliver herbicide from reservoir to clamp part.

International Patent Application Publication No. WO2014/110634 teaches a device for weed extermination which has a shaft with a handle and a squeezer that enables a gripper (pincer) to close around a stalk of a plant to be exterminated. The gripper has at least one application surface for making contact with the plant to apply liquid herbicide thereto. A reservoir for herbicide is provided within the shaft and handle. Pads and rollers are provided on the gripper to selectively apply herbicide to a plant stalk within the gripper.

Similar, although lacking a central shaft, EP1493331A1 teaches as apparatus for manual, selective treatment of plants and uses thereof. The apparatus has a reservoir connected to a hose which is connected to a pair of rigid arms that have a roller and counter-pressure part to apply a chemical substance selectively to plant through direct contact.

It is known for a small amount of chemical is applied directly to a plant from the end of a stick or other rigid lengthy material. In most cases, the device operates simply by pressing the herbicidal application end of the shaft directly to the targeted plant. U.S. Pat. No. 4,894,948 teaches a handheld apparatus for selective application of liquid herbicide directly to a plant and includes a length of tubing with a handle on one end and an applicator on the other. The tubing serves as a reservoir for liquid herbicide but lacks a pincer movement feature.

Similarly, U.S. Pat. No. 5,108,036 teaches handheld equipment for application of herbicide which has a handle member (with a counterbalance) and an operative portion. The handle member has a trigger, and the operative portion has a distribution head that applies. U.S. Pat. No. 6,014,836 teaches a hand-held contact herbicide applicator having a handle and a dispensing end with a tubular shaft therebetween. The herbicide reservoir is within the tubular shaft. The dispensing end contains an absorbent sleeve with ridges between which the herbicide is dispensed. No trigger is required.

U.S. Pat. No. 8,418,400 teaches a liquid herbicide applicator in which a long adjustable handle member and a reservoir removably coupled to the handle member, the reservoir defines an inlet for receiving a liquid and an outlet for dispensing the liquid. The applicator makes use of a sponge to apply the reservoir at the end of a stick (the long adjustable handle member) upon pressing against the targeted plant.

U.S. Pat. No. 8,567,116 teaches herbicide delivery apparatus with a cane-type structure which applies herbicide directly to unwanted foliage. It has an ergonomic handle at a top end and a dauber mechanism at a bottom end with a rotating spherical foam rubber applicator. The interior of the cane structure houses replaceable vessels of liquid herbicide which dispenses herbicide when the applicator is pressed against a surface.

International Patent Application Publication Nos. WO2012/003552A1 and WO2013/102243, additionally demonstrates a bend in the shaft or tubing, teaches applicator devices that include a handle, a squeeze actuator (trigger), a shaft (or long stick), and a clamp (or pincer) opposite the trigger. A container or reservoir is provided for liquid herbicide with a pump for targeted application of herbicide to a plant held between arms of the clamp. A brush is used to directly apply herbicide and is not connected to the clamp (or pincer), but separately attached at the handle.

U.S. Pat. No. 5,555,673 teaches an apparatus and method for applying liquid. In which a generally cylindrical body adapted to holding a liquid, such as water, herbicide, pesticide, or like, with a cap body and a dispensing body. The dispensing body has a valve release that permits targeted application of liquid by when pressed thereby applying an amount of liquid onto a surface.

Similarly, U.S. Pat. No. 6,367,714 teaches a weed stick spray in which an herbicide applicator is in the form of an extended tube with a bell on the bottom to restrict the spray of herbicides from a pump with a nozzle. The spray is dispensed by a pump actuated with a trigger at the end of the stick opposite the bell and spray nozzle. Restricted application of the herbicidal spray within the diameter area of the bulb results (upon actuating the trigger).

Sponge-based applicators are known. U.S. Pat. No. 6,394,681 teaches an herbicide applicator assembly including a liquid applicator in the form of a resiliently compressible, unitary, porous foam mass with a substantially cylindrical applicator surface for applying liquid from a source. A spacer wheel is provided that the sponge is attached thereto using the turning of the wheel for targeted application of the herbicide.

U.S. Pat. No. 7,213,997 teaches an herbicide applicator assembly which has an herbicide reservoir in a backpack with a long shaft with handle trigger and wheel applicator on opposite ends for applying the herbicide directly to the area in which the herbicide is desired. In use, the herbicide is applied directly to the roller which rolls the application directly to the desired location.

U.S. Pat. No. 4,624,071 teaches an herbicide applicator of the wiping type having an elongated loop of flexible, solid wick material, which has a conduit to supply pressurized herbicide liquid through nozzles to supply herbicide liquid to the loop wall. The loop is formed of polypropylene carpeting upwardly directing spray nozzles.

U.S. Pat. No. 4,742,642 teaches an herbicide applicator including a plurality of swabbing devices for applying a herbicide to weeds which includes a plurality of nozzles adapted to be removably mounted on a herbicide supply pipe through branch connections. The swabbing member is made of fabric material to be pressed against the bottom of a nozzle.

SUMMARY OF THE INVENTION

The present invention relates to a fluid applicator (12) which is designed to deliver fluids, such as systemic herbicide or pesticide to targeted surfaces (S), without encroachment on adjacent surfaces, and specifically targeted to the surface of plant leaves. The fluid applicator (12) is portable, light weight, collapsible, ambidextrous. The fluid applicator (12) held, and operated, single handedly. The applicator (12) may be used to apply other fluids, including but not limited to dyes, paints, attractive or offensive animal scent, and the like. The applicator may also be used to apply liquid to other surfaces (S) in addition to leaves.

The fluid applicator (12) comprises a pistol grip handle (14), with trigger/lever (16), an operative portion (22), and at least one hollow tube (18) or two hollow tubes with an articulating joint (20) disposed between trigger/lever (16) and the operative portion (22). The operative portion (22) has a set of opposing, vertically held jaws (24 and 26) with a gap between the fluid container (28) and lid (30). Jaw (24 and 26) movement is controlled by the trigger/lever (16) which is attached to the lower jaw (26) via a cable/cord (40) enclosed within the hollow tube (18). Spring straps (34) control excessive clamping force and attach the clamping jaw (24 and 26) to the hollow shaft/tube (18).

Advantages of the present invention involves the ease of use, its variety of functions, and low production cost. The applicator (12) is small and light enough to fit into a backpack when disassembled and folded for storage.

Another advantage of the present design is that it applies uniform pressure to the jaws (24 and 26). Contrary to the designs having scissor-like pincers, the present invention operates by a parallel clamping action on a vertical plane yielding uniform pressure on the sponges (43 and 50) therefore even distribution of fluid.

Unlike the prior art having needles, the present invention targets systemic herbicide or pesticide to the underside of a leaf (S) having natural holes in which stomas provide natural opening into the leaf (S).

As a further advantage, the spring straps (34) controls any excessive forces to the targeted leaf (S), sponges (44 and 50) and cable/cord (40). Additionally, the parallel sponge (43 and 50) contact surfaces are always held horizontally and the container with primary sponge (43) also acts as catchment for any excess fluid. There isn't a concern for herbicide or pesticide dripping.

In a further advantage, the systemic herbicide or pesticide with sponges (43 and 50) are self-contained, and changing herbicide or pesticide is as easy as changing out the container (28 or 42) and lid (30 or 46), slip off then slip on the operational jaws (24 and 26). The operator can move from a non-selective herbicide to a selective herbicide or inorganic to organic or various selective pesticides with ease and no possible cross-contamination.

Further advantages include that the fluid applicator (12) is simple, light weight (approximately less than one pound). The applicator (12) is easily adjustable to an operator's stature. Also, the applicator (12) is easy to learn to use to administer systemic herbicide or pesticide to targeted plants. Plants targeted can be annuals or perennials with or without woody stems that have leaves to which the systemic herbicide or pesticide will be applied. The leaves can be just off the ground to several feet high, such as Poison Ivy.

These and other aspects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

FIGS. 13A-13C show yet another alternative container (42) and lid (46) and components thereof.

Similar reference characters denote corresponding features consistently throughout the attached drawings.

DETAILED DESCRIPTION OF PREFERRED EMBODIMENTS

Figure 1:
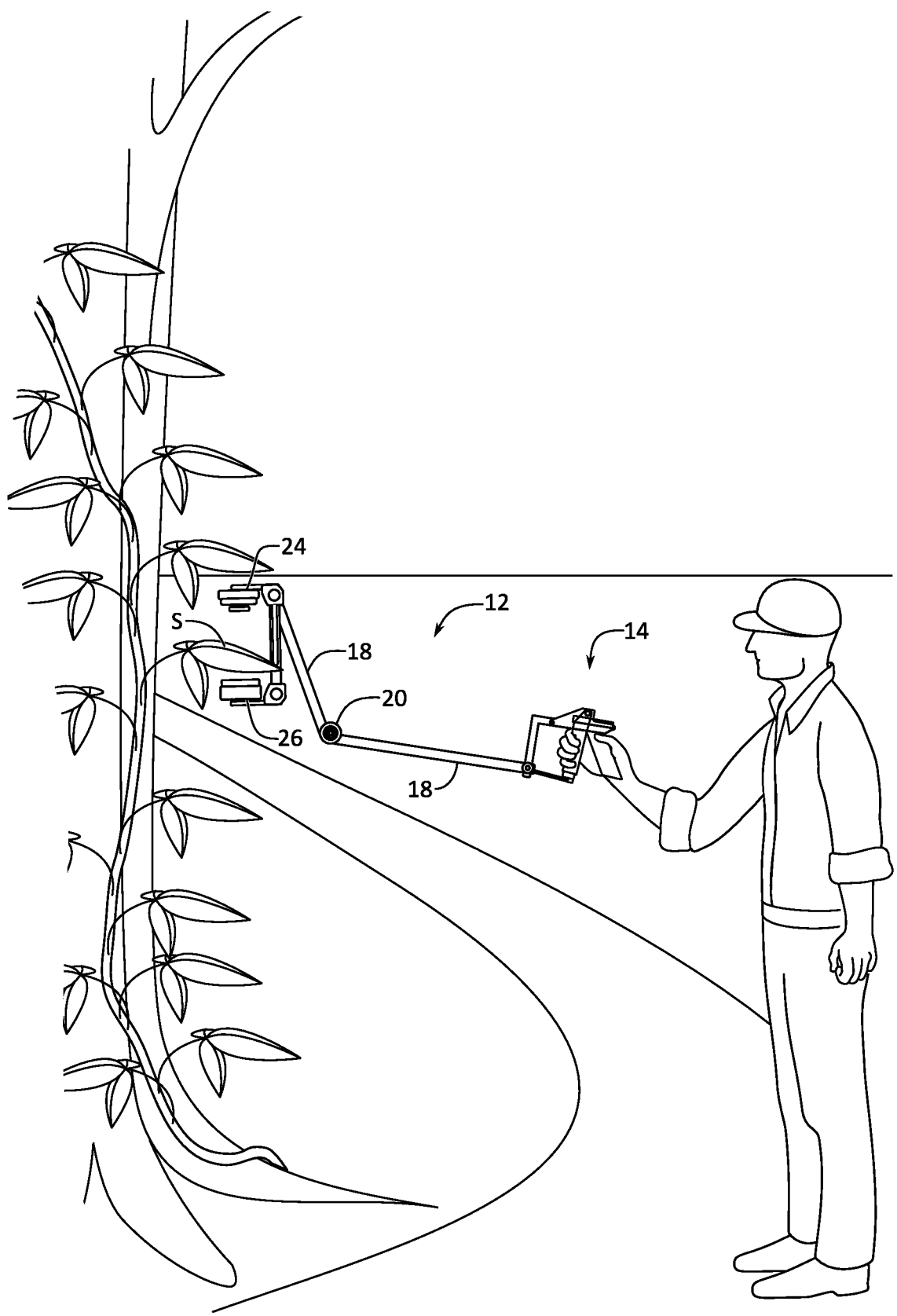
FIG. 1 shows an environmental view of a fluid applicator (12) according to an embodiment of the present invention which is used to apply fluids to specific targeted surfaces (S).

The present invention relates to a fluid applicator (12) which is designed to deliver fluids, such as systemic herbicide or pesticide to targeted surfaces (S), without encroachment on adjacent surfaces, and specifically targeted to the surface of plant leaves (S). The fluid applicator (12) is held, and operated, single handedly, as shown in FIG. 1. The fluid applicator (12) comprises a pistol grip handle (14), with trigger/lever (16), an operative portion (22), and at least one hollow tube (18) or two hollow tubes (18) with an articulating shaft joint (20) disposed between trigger/lever (16) and the operative portion (22). When the trigger/lever (16) is pulled the jaws (24 and 26) move together whereby the sponges (43 and 50) will meet and fluid is shared. This allows for systemic herbicide or pesticide to transfer from the lower/primary sponge (43) to the upper sponge (50). As shown in FIG. 1, the operator can reach leaves (S) from a few inches off the ground to several feet above always maintaining the sponges (43 and 50) in a vertical opposing position. With a leaf (S) between, both sides of the leaf (S) receive systemic herbicide or pesticide. Most significantly, the underside of the leaf (S) where natural holes (Stomas) allow immediate penetration are treated.

All made of light weight material such as aluminum, plastic or composite, or the like. The operative portion (22) has a set of opposing, vertically held jaws (24 and 26) with an approximate but not limited to two-inch (2") gap between when the fluid container (28 or 42) and lid (30 or 46) is attached. The hollow tube (18) attaches via a bolt/rod (32) to the upper jaw (24) by way of two spring steel straps (34) or other spring like material not excluding plastics and composites. Jaw (24 and 26) movement is controlled by the trigger/lever (16) which is attached to the lower jaw (26) via a cable/cord (40) enclosed within the hollow tube (18), as shown in FIGS. 2A-2C.

Figure 2A:
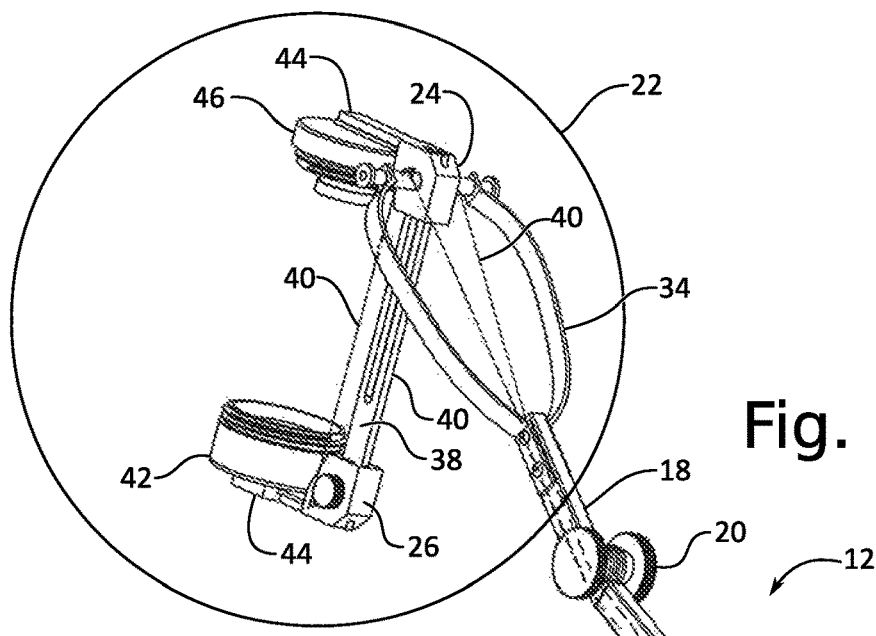
FIGS. 2A, 2B, and 2C show a perspective view of the fluid applicator (12) including alternative cable/cord (40) configurations according to alternative embodiments of the present invention.
Figure 3:
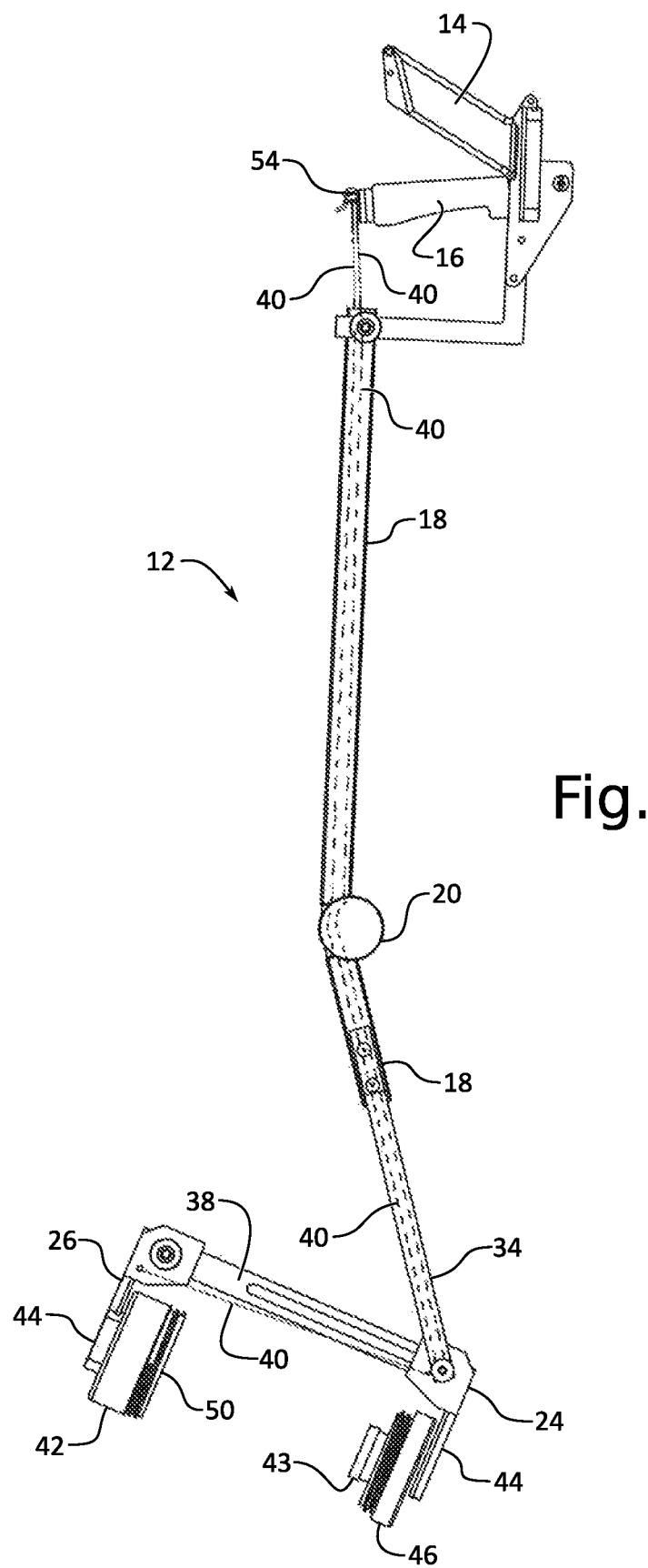
FIG. 3 is a side view of the fluid applicator (12) of FIG. 2A.
Figures 4, 5:
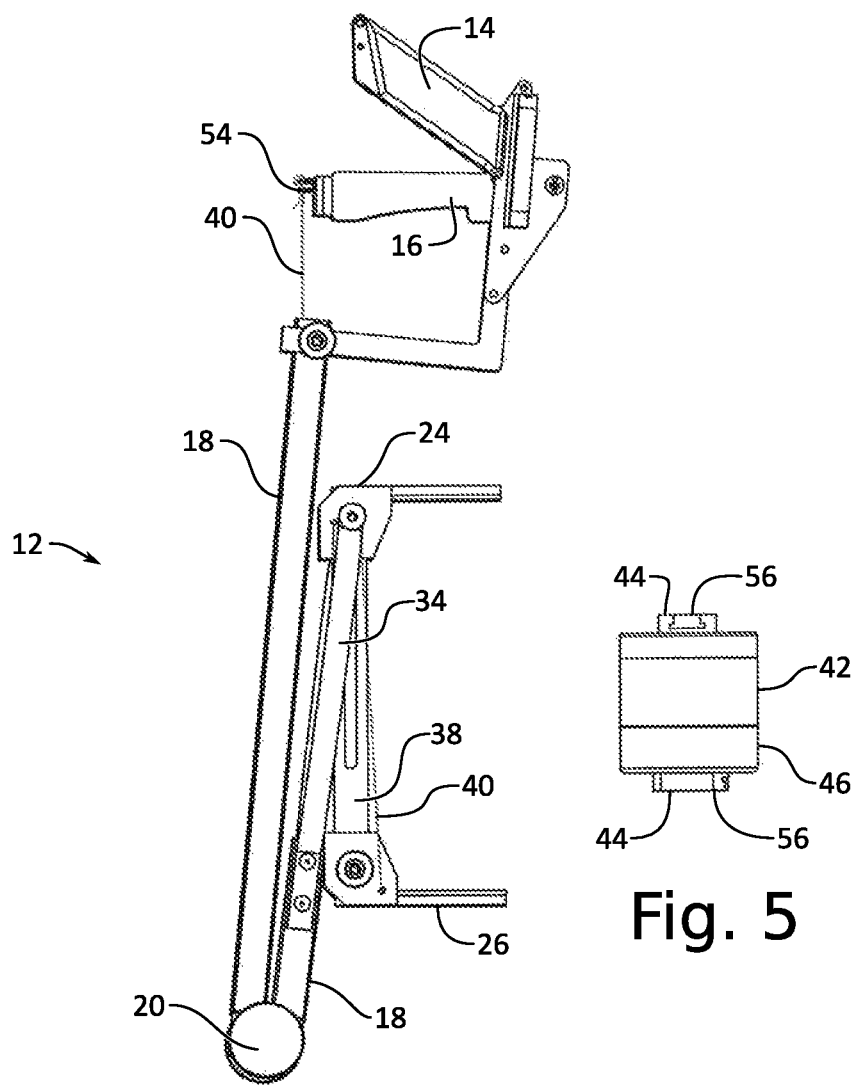
FIG. 4 is a side view of the fluid applicator (12) of FIGS. 2A and 4 folded up for storage or transportation.
FIG. 5 is a side view of the wide mouth container (44) which is attached to the jaws (24 and 26) of FIGS. 1-3.

The operative portion (22) attachment allows the jaws (24 and 26) to move respective to the hollow tube (18), as shown in the side view of FIGS. 3 and 4. The upper jaw (24) is attached to the hollow tube (18) at an axis and can freely rotate about the axis to permit folding the applicator (12) transportation or storage. The lower jaw (26) is kept in alignment and opposite (parallel) with the upper jaw (24) via a slotted shaft (38). The handle trigger/lever (16) and the lower jaw (26) are attached to a cable/cord (40) running through the hollow tube (18) acting as conduit. The cable/cords (40) are connected to the trigger (16) optionally with a D ring attachment (54), extend through the hollow tube (18), and split into two at the operative portion (22) as shown in FIG. 2A, so that pulling the trigger (16) tightens the cable/cord (40) which in turn pulls the lower jaw (26) toward the upper jaw (24) parallel and evenly. The spring straps (34), which attach the slotted shared shaft (38) to the hollow tube (18), control for excessive clamping forces and may be composed of any suitable flexible material, including steel, plastic, and the like.

Figure 2B:
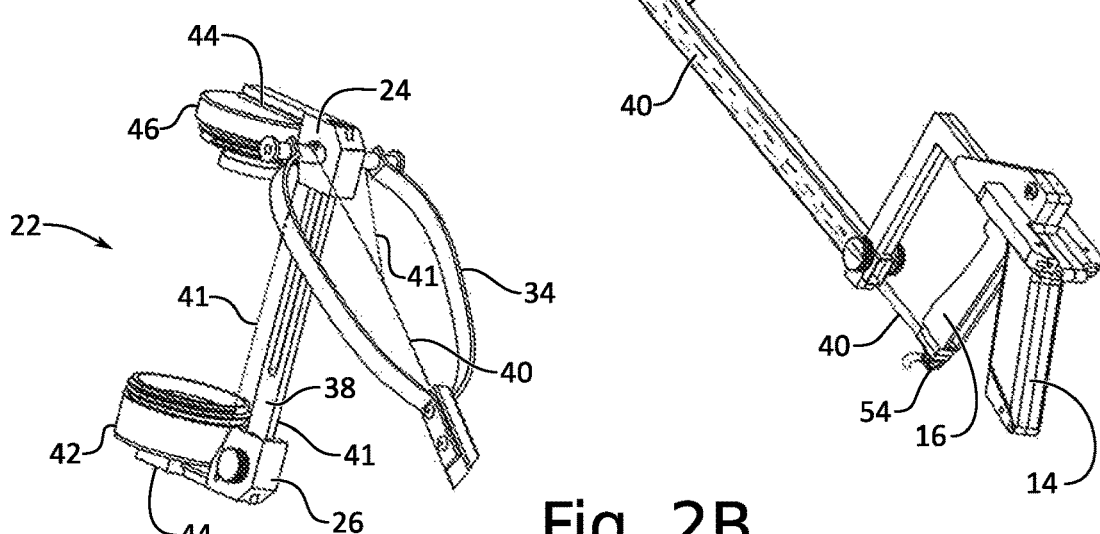
Figure 2C:
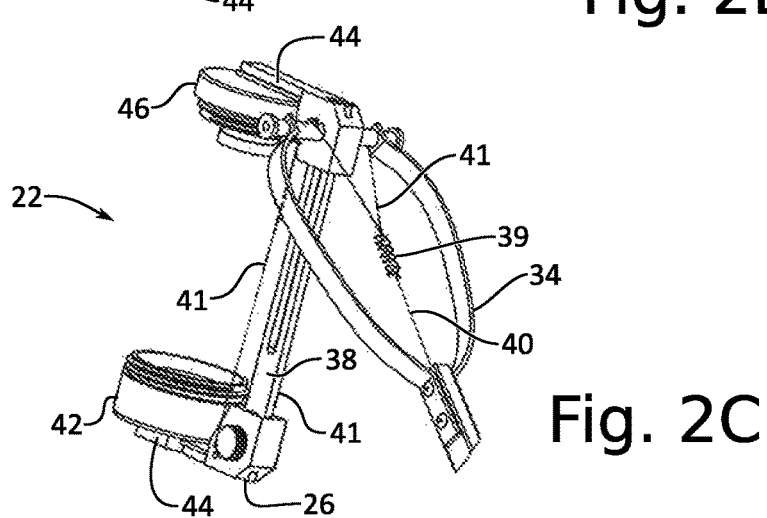

FIG. 2A shows an embodiment in which the cable/cords (40) split where they exit the tube (18) in the operative portion (22). In alternative embodiments, the length of cable/cord (40) separates into two cables/cords (41) after exiting the tube (18), as shown in FIGS. 2B and 2C. A spring (39) may be disposed between the cable/cord (40) and the separated cables/cords (41), as shown in FIG. 2C. The cables/cords (41) may be the same cable/cord (40) which runs the length of the tube (18) in FIG. 2B, or it may be separate as in FIG. 2C.

A wide mouth container (42) and lid (46) are shown closed for storage and transport in FIG. 5. In FIGS. 1-3, the container (42) is attached to the lower jaw (26) via an attachment (44), which may include slip-on shoe or sheath (56), or another temporary attachment method not excluding hook and loop (such as Velcro), latches, clips, magnets, screws, tape, or the like. The container (42) is preferably composed of transparent plastic to view fluid level housing systemic herbicide or pesticide. A lower sponge (43) or another absorbent material with capillary properties is disposed within the center of the container (42). Alternatively, and less advantageous, non-transparent plastic, metal, or even glass may be used, as well. The upper jaw (24) has the container's (42) lid (46), preferably transparent to view any debris accumulation attached via an attachment (44) such as a slip-on shoe or sheath (56) or another temporary attachment method (44) not excluding hook and loop (such as, Velcro), latches, clips, magnets, screws, or the like with an upper sponge (50) or another absorbent material with capillary properties attached permanently or temperately to the inside bottom (52).

Figure 6B:
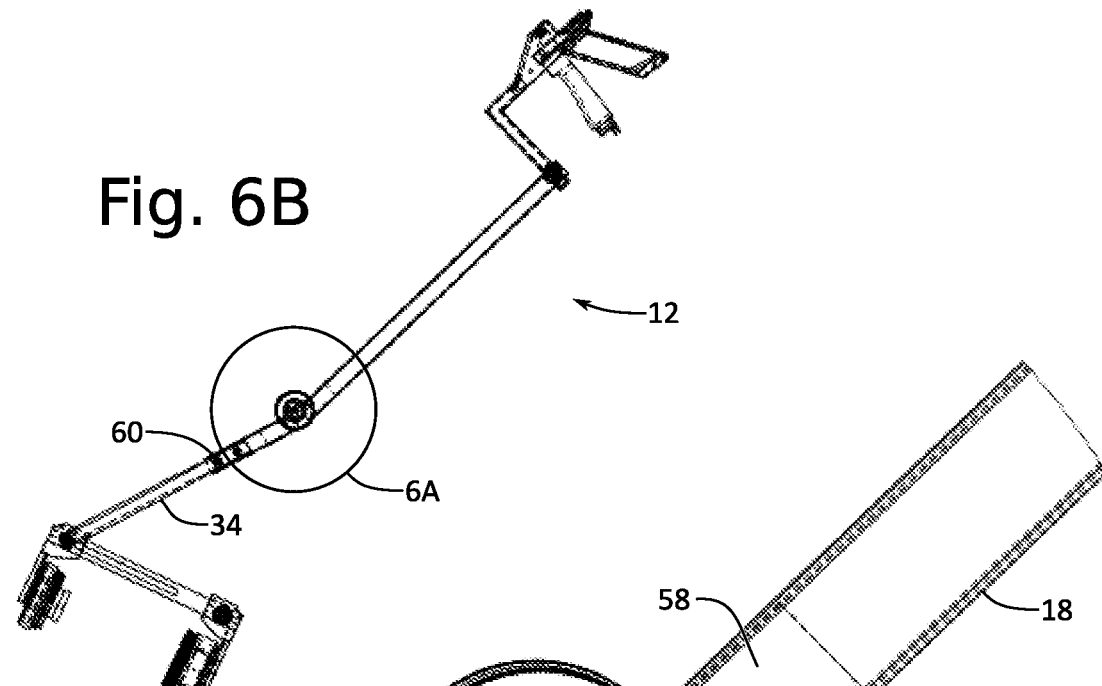
FIGS. 6A-6C show the articulating joint (20) along the tube (18) of the fluid applicator (12).
Figure 6A:
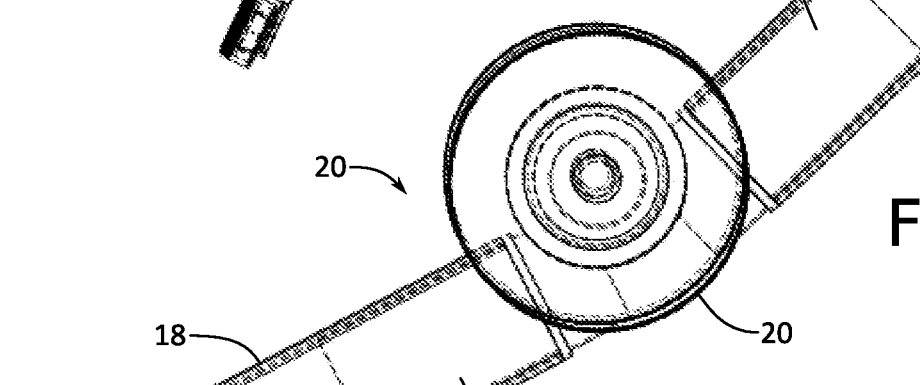
Figure 6C:
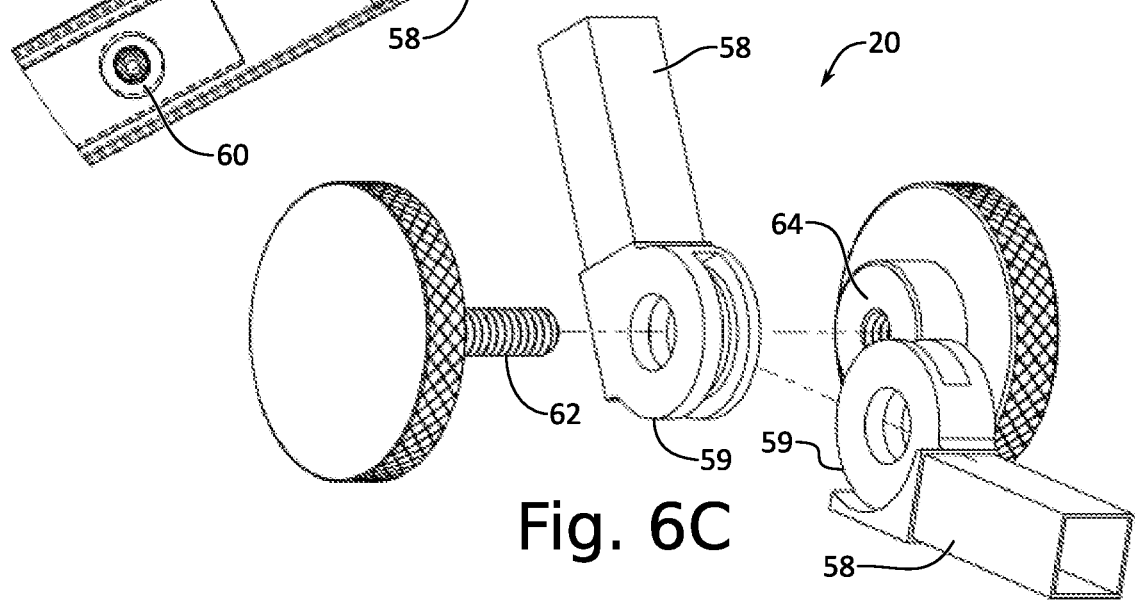
Figure 7B:
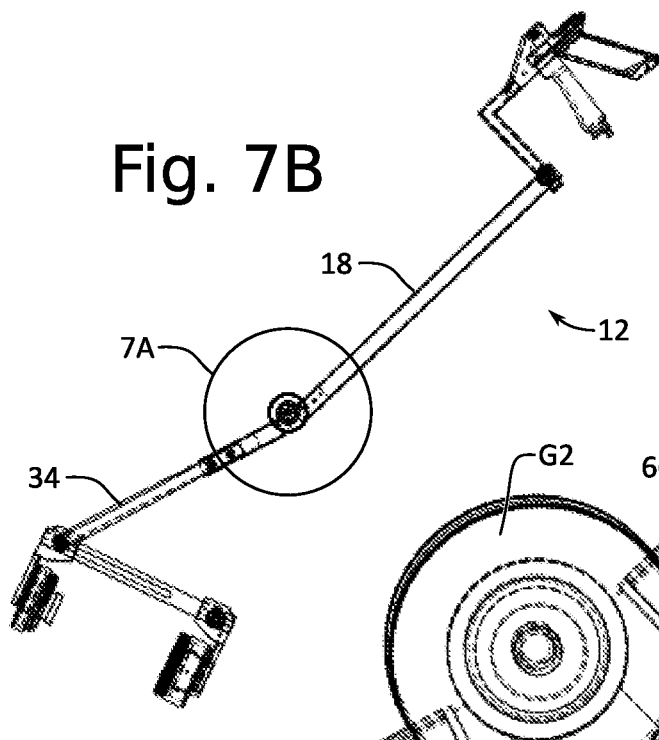
FIGS. 7A-7C show an alternative embodiment of the articulating joint (20) which has a telescoping portion (60).
Figure 7A:
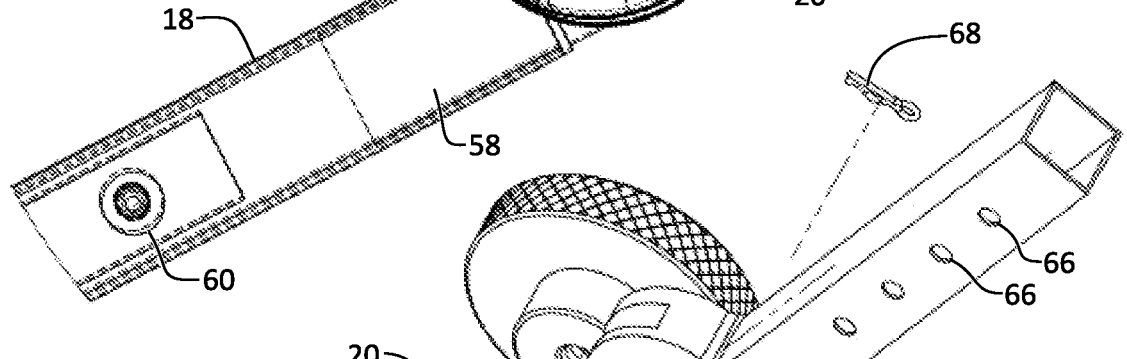
Figure 7C:
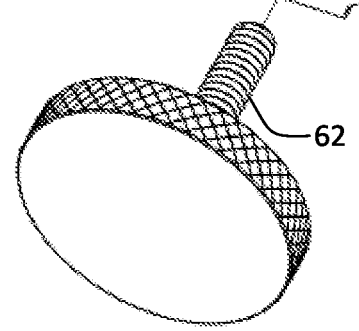

FIGS. 6A-6C show an embodiment of the present invention with an articulating shaft joint (20) that permits folding of the applicator (12) for storage or to put in a backpack. The articulating shaft joint (20) is composed of two joint sections (59) which fit together by a bolt (62) and nut (64) forming a joint (20). Each of the joint sections (59) have a length of hollow pipe section (58) extending from them in opposite directions. An alternative embodiment of the articulating joint (20) is shown in FIGS. 7A-7C. In this embodiment, one of the two joint sections (59) is longer and has openings (66) therethrough to create an adjustable length applicator (12). Additional, telescoping sections of pipe (18) may be used in addition to or in lieu of plain piping (18). In the exploded view, FIG. 7C shows a pin (70) and a cotter pin (68) which are used to affix the telescoping section of the joint section (58) in place.

Figure 8B:
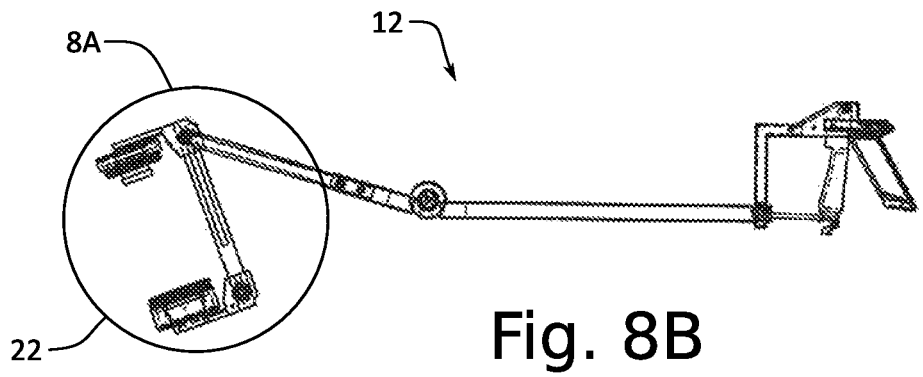
FIGS. 8A-8C show the details of the operative portion (22).
Figure 8A:
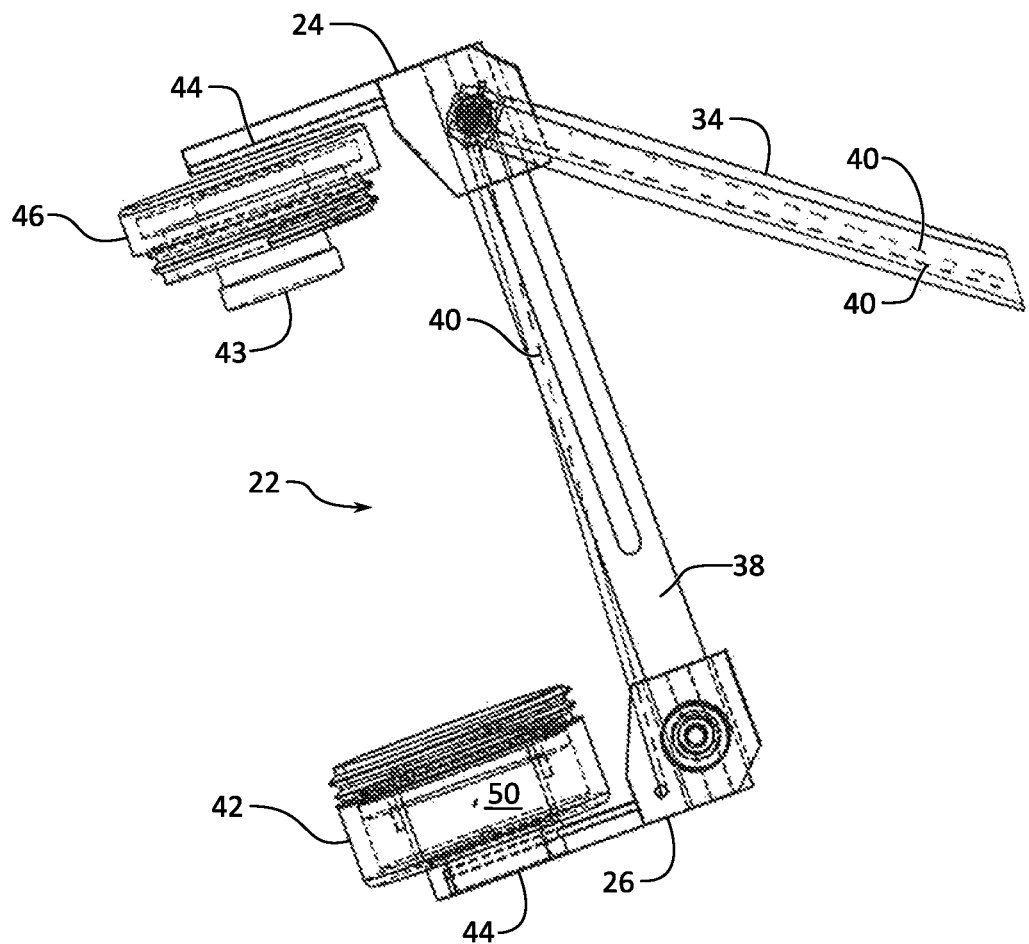
Figure 8C:
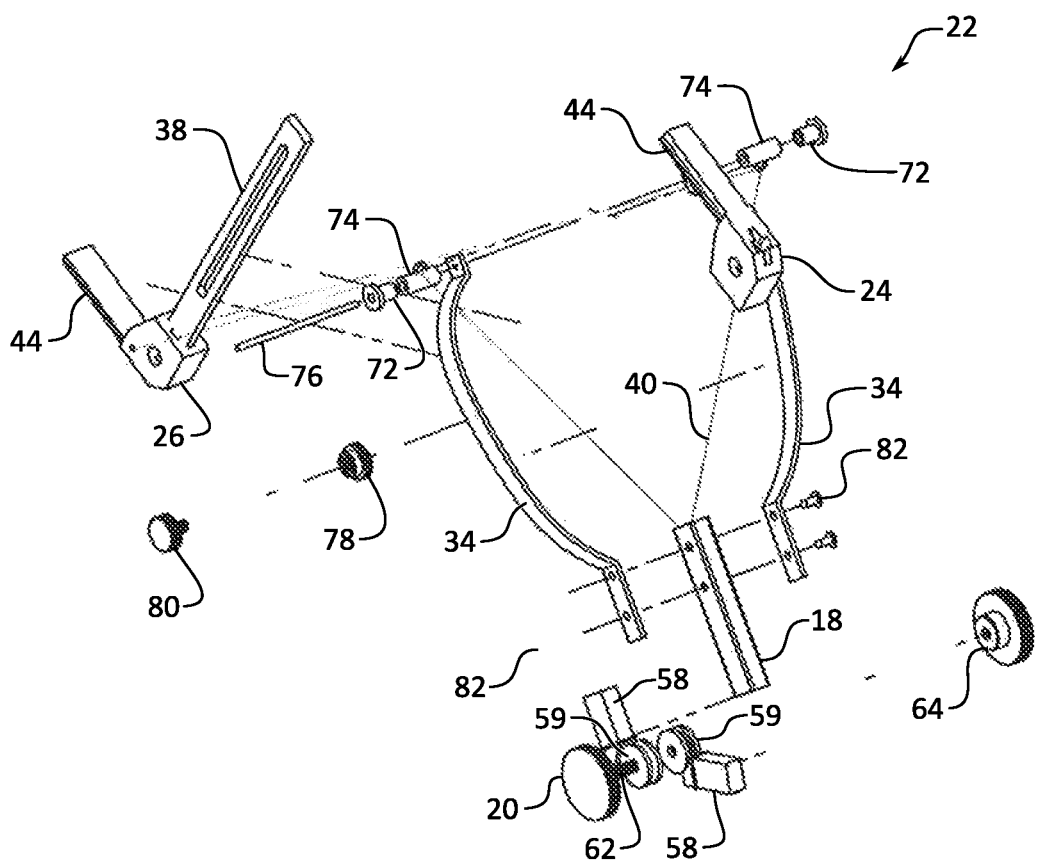

FIGS. 8A-8C demonstrate how the opposing jaws (24 and 26) are configured. FIG. 8A is a closeup side view of the operative portion (22) of an embodiment which shows more details of the container (42) and lid (46) and where the upper sponge (43) and lower sponge (50) are located. The container (42) and lid (46) are attached to the lower (26) and upper jaws (24) as shown by an attachment (44) such as temporary glue or tape. FIG. 8C is an exploded view of the operative portion (22) without the container (42) and lid (46), and including the length of hollow tube pipe (18) and articulating shaft joint (20). Thumb nut bolts (62 and 80) and thumb nuts (64 and 78) are shown, but regular nut bolts and nuts may replace any thumb nut bolts (62 and 80) and/or thumb nuts (64 and 78). The length of hollow tube pipe (18) has openings to attach to the springs (34). The articulating shaft joint (20) may be omitted in which case the springs (34) are attached to the pipe (18) opposite the handle (14). As can be seen in the exploded view of FIG. 8C, the upper jaw (24) is rotatably attached to the springs (34) by thumb nuts (72) through spacers (74) with a threaded rod (76) therethrough as shown. The threaded rod (76) or equivalent forms an axis of rotation within the line of the tube (18) so that the jaws (24 and 26) rotate relative to the tube (18) in line with handle (14) as shown in FIG. 4.

Figure 9A:
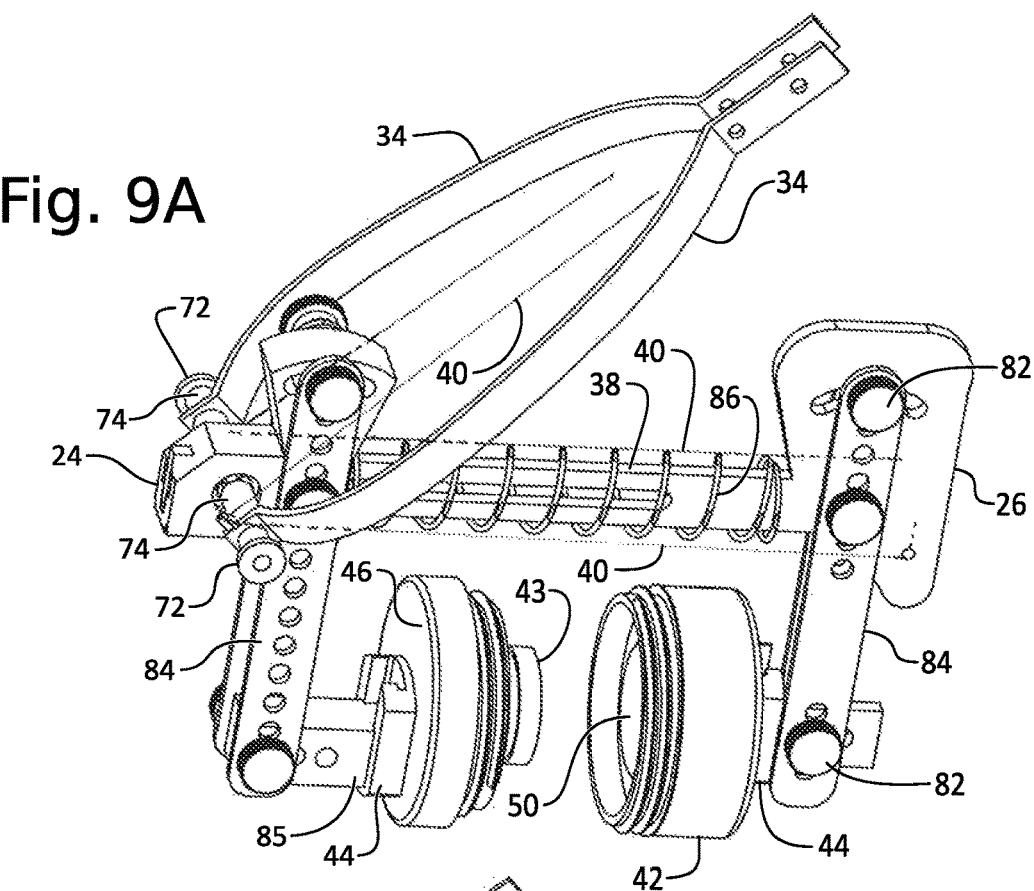
FIGS. 9A and 9B show the details of an environmental and exploded views of an operative portion (22) according to an alternative embodiment of the present invention.
Figure 9B:
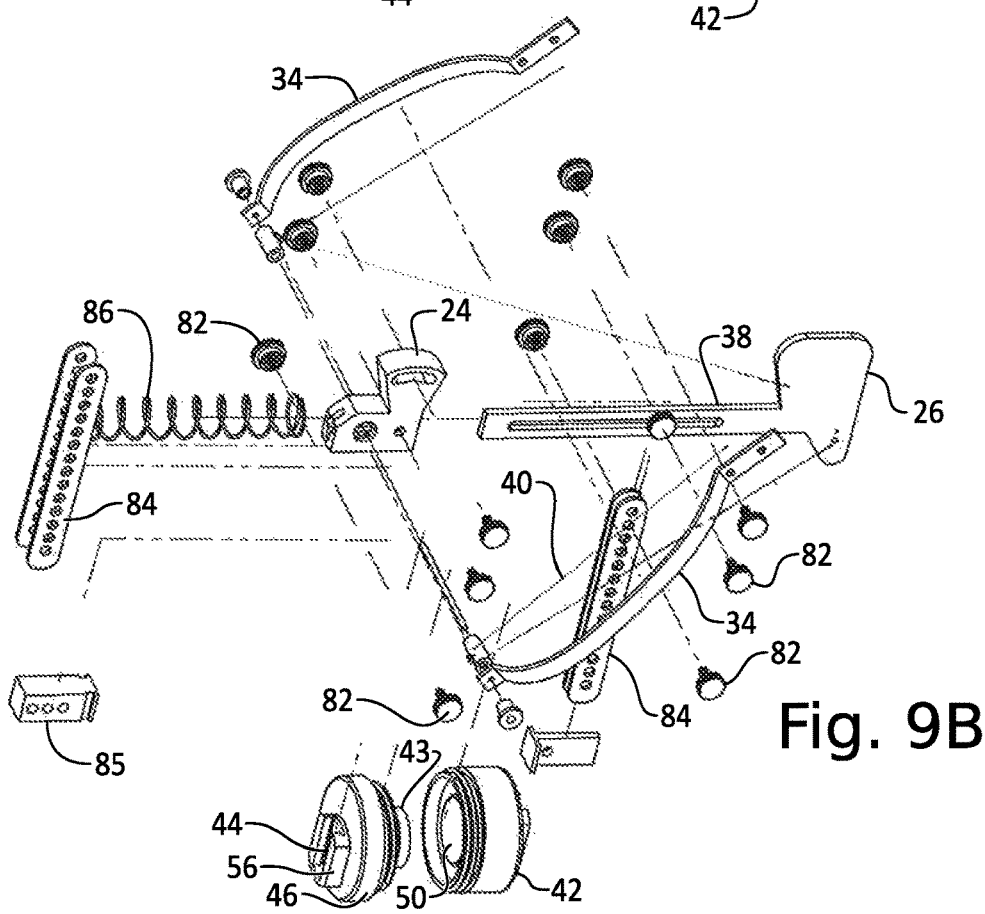

FIGS. 9A and 9B show an alternative embodiment of an operative portion (22) with container (42) and lid (46) connected to the lower jaw (26) and upper jaw (24) via a set of adjustable arms (84) which extend from the lower jaw (26) and the upper jaw (24). The adjustable arms (84) are attached to the container (42) and lid (46) using adjustment foots (85) which are used as attachments (44). The configuration of this alternative embodiment is shown most clearly in the exploded view of FIG. 9B. The lower jaw (26) has the slotted shaft (38) with a spring (86) on the shaft (38). The upper jaw (24) moves along the slotted shaft (38) when the rigger/lever is pulled. The nuts and bolts (82) are used to fasten everything together, as shown in FIG. 9A.

Figure 10B:
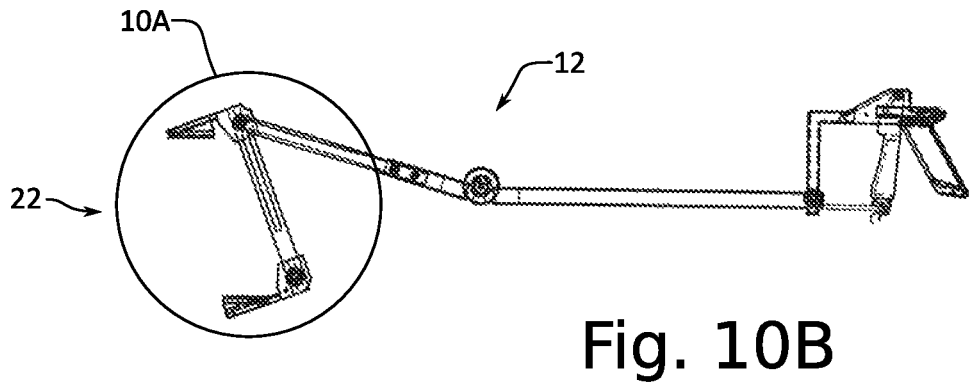
FIGS. 10A and 10B show an alternative embodiment of the operative portion (22) showing an alternative set of jaws (24 and 26).
Figure 10A:
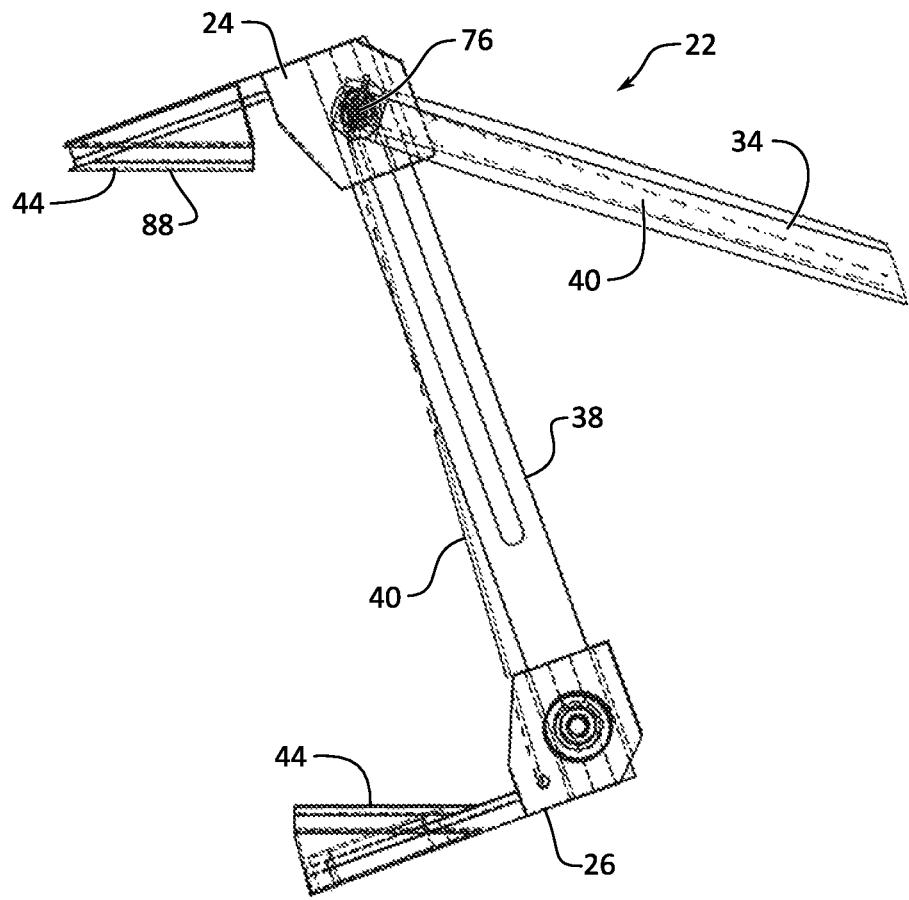

FIGS. 10A and 10B show an alternative operative portion (22) according to another embodiment of the applicator (12). In this embodiment, the upper jaw (24) and lower jaw (26) have an alternative attachment (44) to hold the container (42) and lid (46). Specifically, a wedge (88) attachment (44), as shown in detail in FIG. 10A, is used that corresponds with a shoe (56) attachment (44) on the container (42) and lid (46).

Figure 11A:
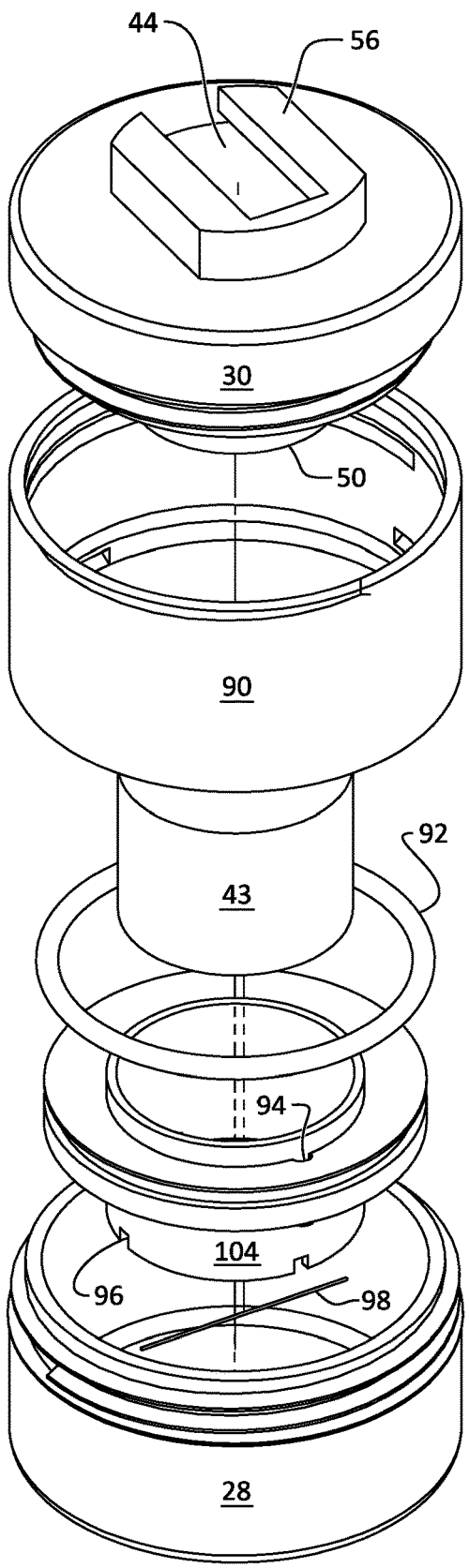
FIGS. 11A-11C show an alternative container (42) and lid (46) and components thereof.
Figure 11B:
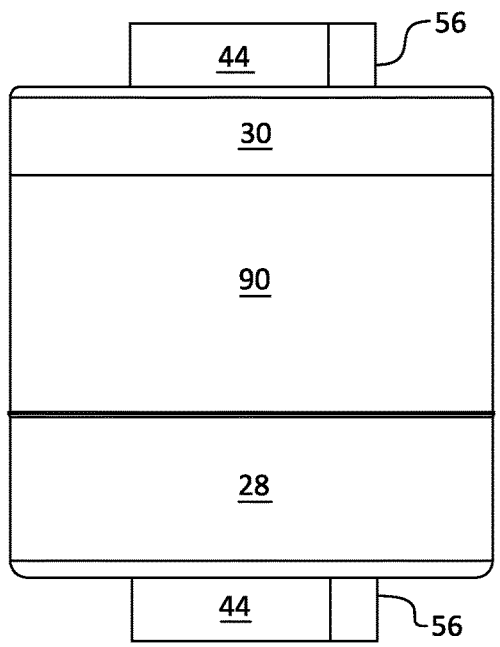
Figure 11C:
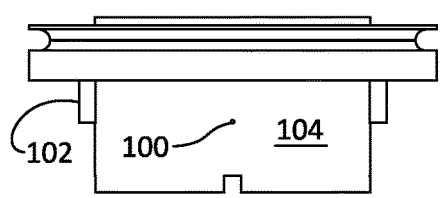

Alternative containers (28) and lids (30) are shown in FIGS. 11A-16, and in FIGS. 17A-17D. Similar features have the same reference numbers throughout. FIG. 11A-11C show an embodiment of the container (28) and lid (30) that may be used instead of the generalized container (42) and lid (46) shown in FIG. 5 and FIG. 8A. The exploded view of FIG. 11A shows a lid (30) with a shoe (56) attachment (44), and FIG. 11B shows a shoe (56) attachment (44) on both the lid (30) and container (28). A spacer (90) is disposed between lid (30) and container (28) in this embodiment to keep the sponges (43 and 50) from being compressed and deformed against each other. The sponge (50) is disposed within the lid (30). Another sponge (43) is placed within container (28) both the sponge (43) and concave cone/disk structure (104) with that channels excess fluid back to the container (28). The concave cone/disk structure (104) also has extrusion tubes (102), as shown in FIG. 11C, and a hole (100). A pin (98) that is pushed through a hole (100) in the structure (104) is used to secure the sponge (43) in place. The fill/drain holes (94) receive fluid that then flows through the slots (96) to return fluid into the container (28). An 0 ring (92) is disposed between concave cone/disk structure (104) and the container (28) to prevent fluid from spilling should the container (28 and 30) be on its side.

Figure 12A:
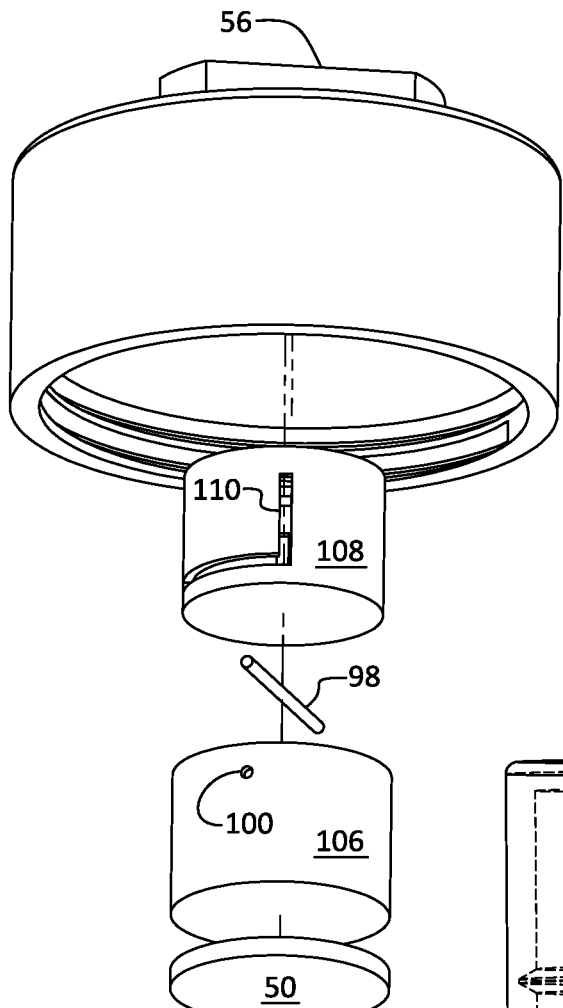
FIGS. 12A-12C show another alternative container (42) and lid (46) and components thereof.
Figure 12B:
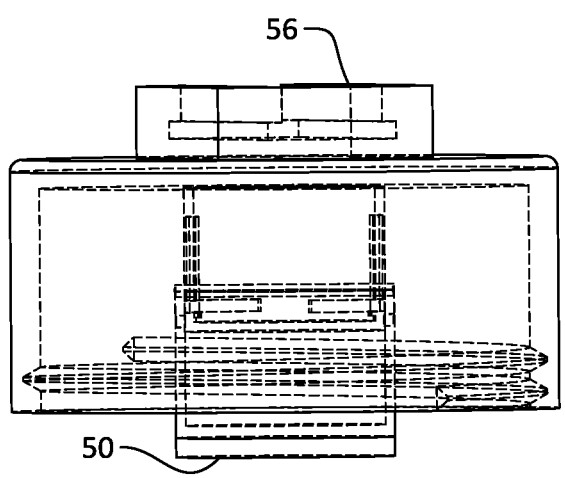
Figure 12C:
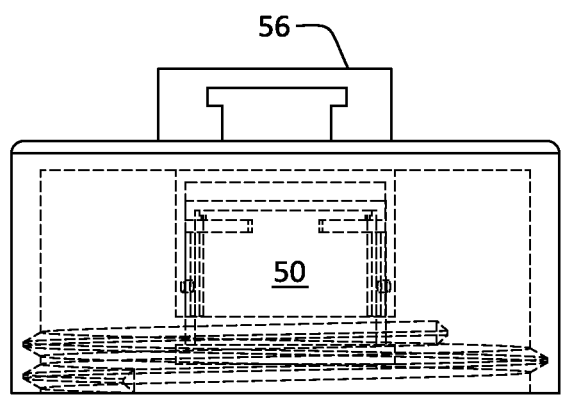

An alternative lid (30) is shown in FIGS. 12A-12C. In this embodiment, the sponge (50) is disposed on/in a cylinder (106) with an opening (100) that fits into a slotted cylinder (108) that has a slot (110) which can receive a pin (98) to hold the two cylinders (106 and 108) and sponge (50) together in the lid (30). In this embodiment, the sponge (50) as shown in FIG. 12B can be retracted into the lid (30) as shown in FIG. 12C thanks to the slot (110).

Figure 14A:
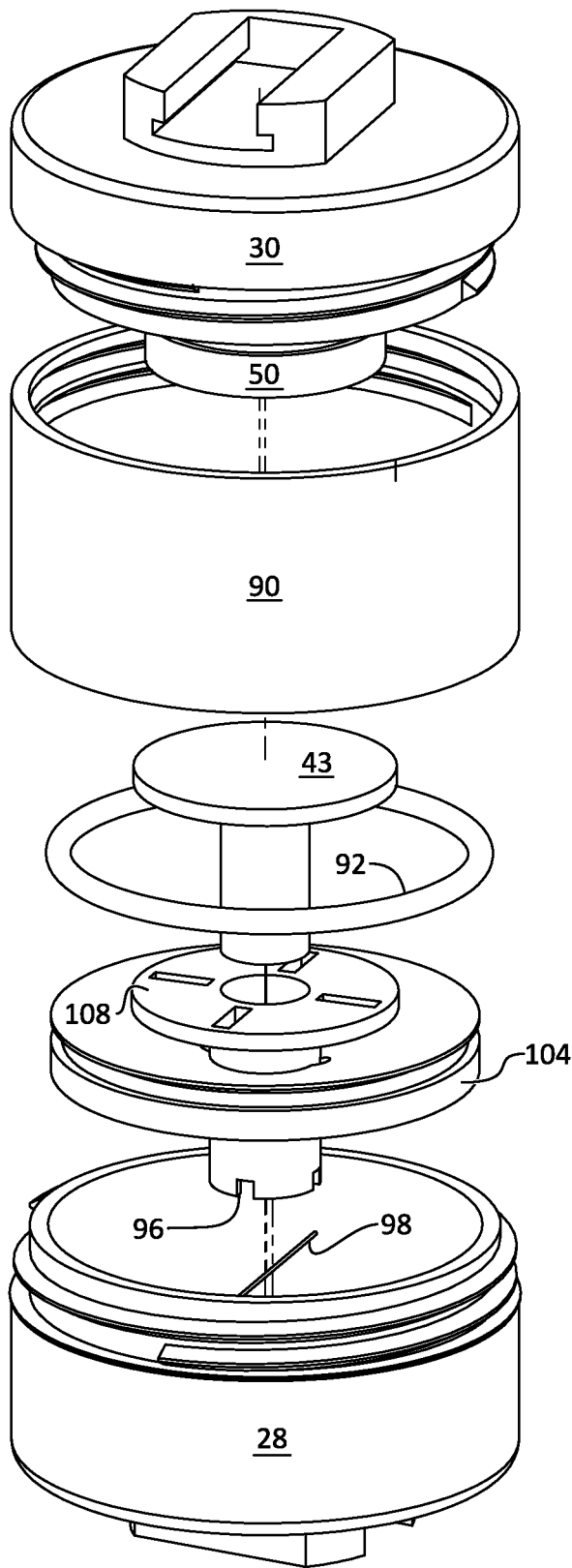
FIGS. 14A-14C show a further alternative container (42) and lid (46) and components thereof.
Figure 14B:
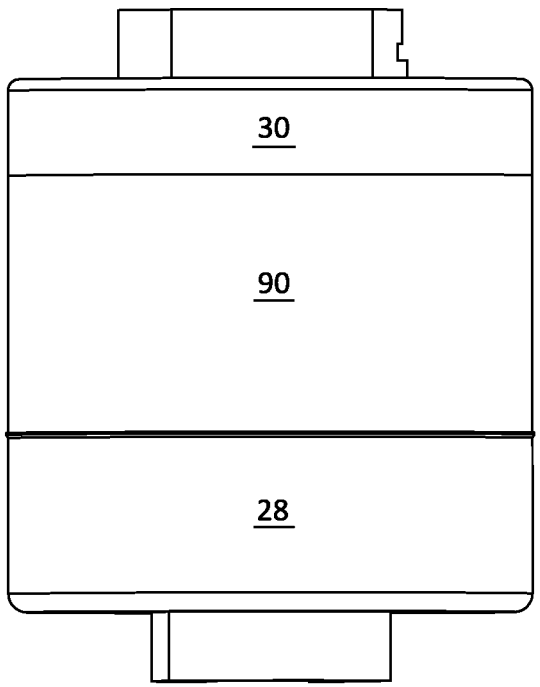
Figure 14C:
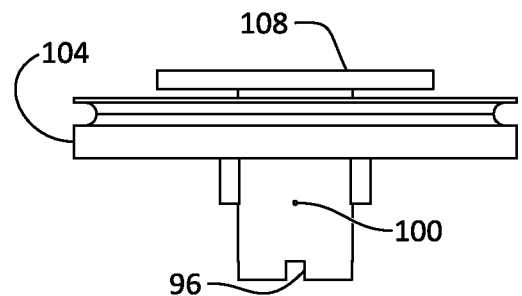
Figure 15A:
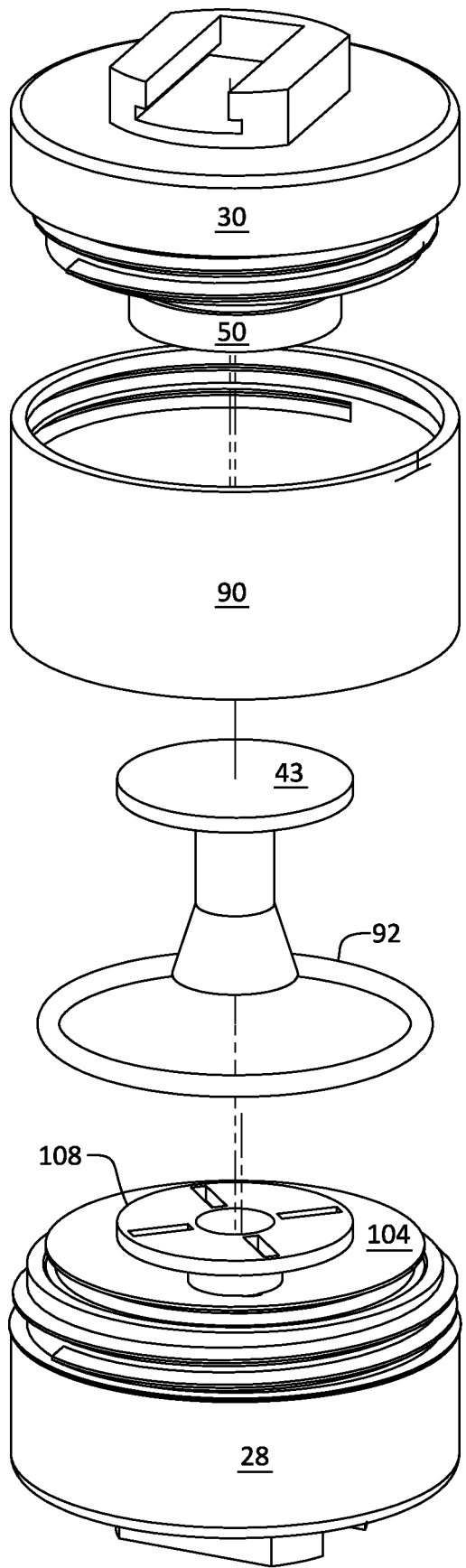
FIGS. 15A-15C show yet a further alternative container (42) and lid (46) and components thereof.
Figure 15B:
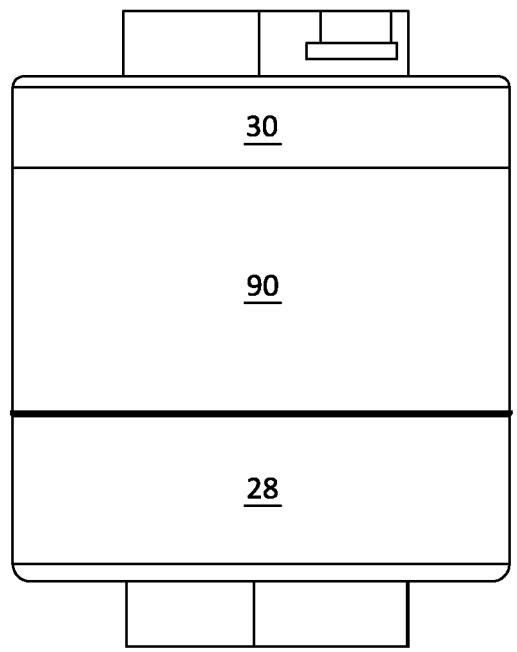
Figure 15C:
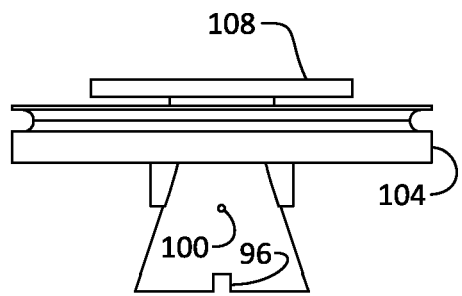

FIGS. 13A-13C show an alternative embodiment in which the sponge 43 has a different configuration and fits into an alternative concave cone/disk structure (104) with sponge support (108), as shown in FIG. 13A. FIG. 13C shows the alternative embodiment of the structure (104) from an angle showing the pin (98) and support (108) more clearly. FIGS. 14A-14C show another embodiment in which the sponge (43) has a different configuration and fits into another alternative concave cone/disk structure (104) with a sponge support (108) as shown in FIGS. 14A and 14C. FIGS. 15A-15C show another arrangement with different shaped components that serve the same function, as in the other alternative embodiments of FIGS. 11A-115C. Note that although an O-ring (92) is located in different positions in the varied embodiments, the invention is not limited to a single O-ring (92) per device.

Figure 16:
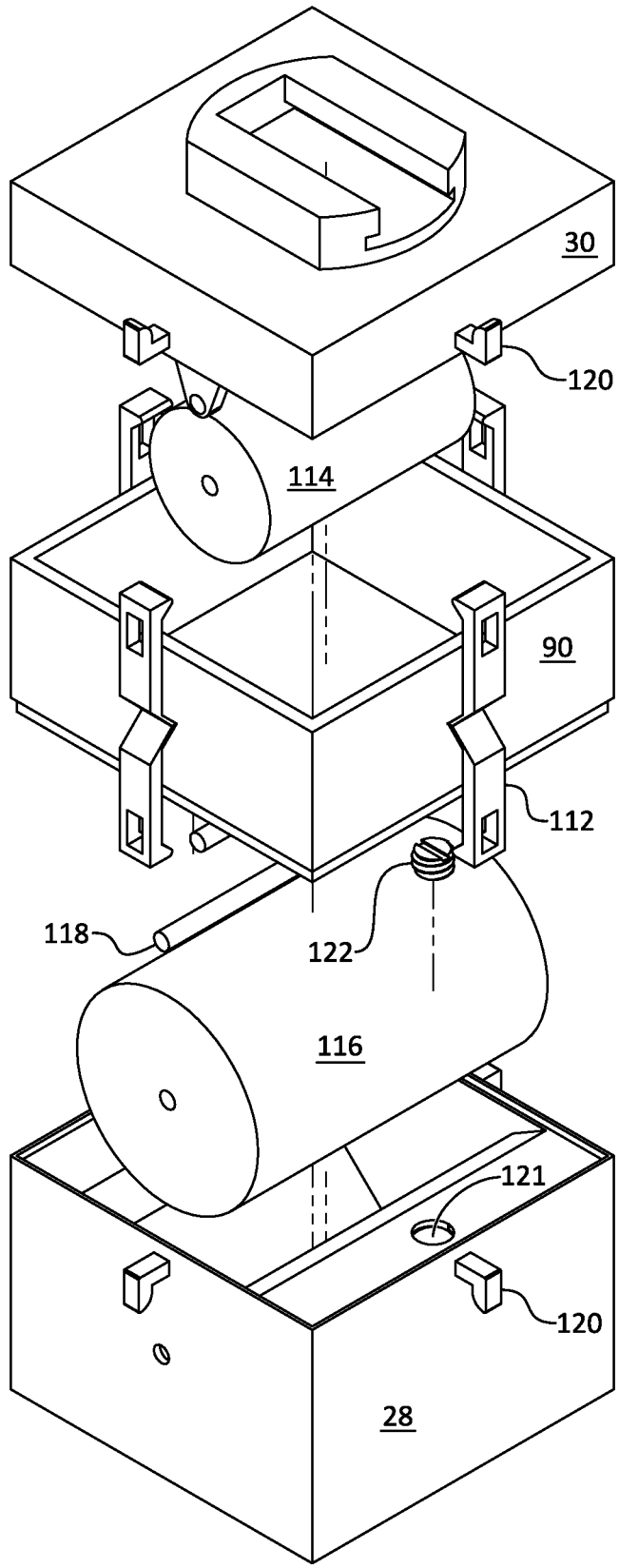
FIG. 16 shows an alternative embodiment of a container (42) and lid (46) using gel which substitutes rollers (114 and 116) for sponges (43 and 50).

FIG. 16 is an alternative embodiment that replaces the sponges (50 and 43) with rollers (114 and 116) to apply a gel. In this embodiment the lid (30), spacer (90), and container (28) are all square box shaped, in which each is attached to the other via flexible latch (112) and latch point (120). Roller shafts (118) are disposed to hold the rollers (114 and 116) in position relative to the container (28) and the lid (30) as shown. A fill hole (121) is provided in the container (28) which can be closed using a closure screw (122).

Figure 17A:
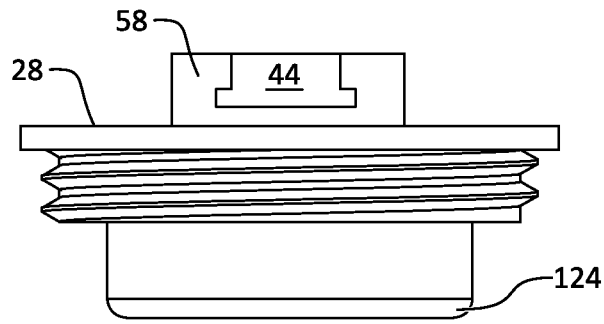
FIGS. 17A-17D shows an alternative design of the container (42) and lid (46) which uses paste cakes (124) instead of sponges (43 and 50) or rollers (114 and 116).
Figure 17B:
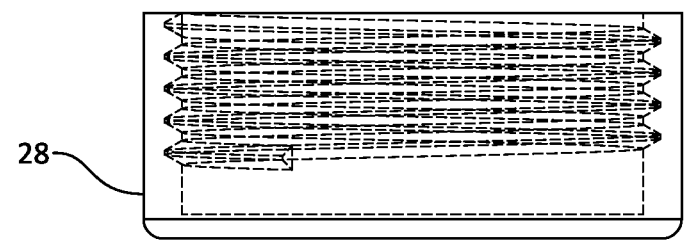
Figure 17C:
Figure 17D:
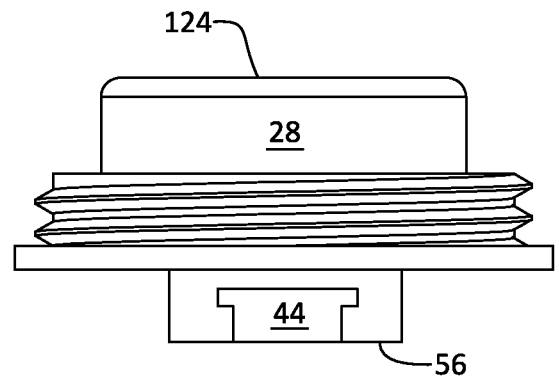

FIGS. 17A-17D shows an alternative design of a container (42) and lid (46) which uses paste cakes (124) instead of sponges (43 and 50) or rollers (114 and 116). In this embodiment, two containers (28) and lids (30) are used, in which a container (28) with a paste cake (124) securely held in placed are disposed on each of the upper and lower jaws (24 and 26). Each of the containers (28) has a shoe (56) extending therefrom. FIG. 17A attaches to the upper jaw (24) and FIG. 17D attaches to the lower jaw (26). The lids, shown in FIGS. 17B and 17C, are removed during use.

Figure 18B:
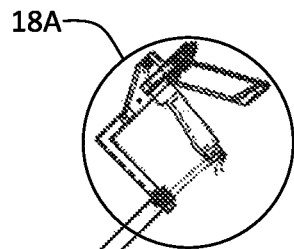
FIGS. 18A and 18B show the handle (14) and trigger (16) in more detail.
Figure 18A:
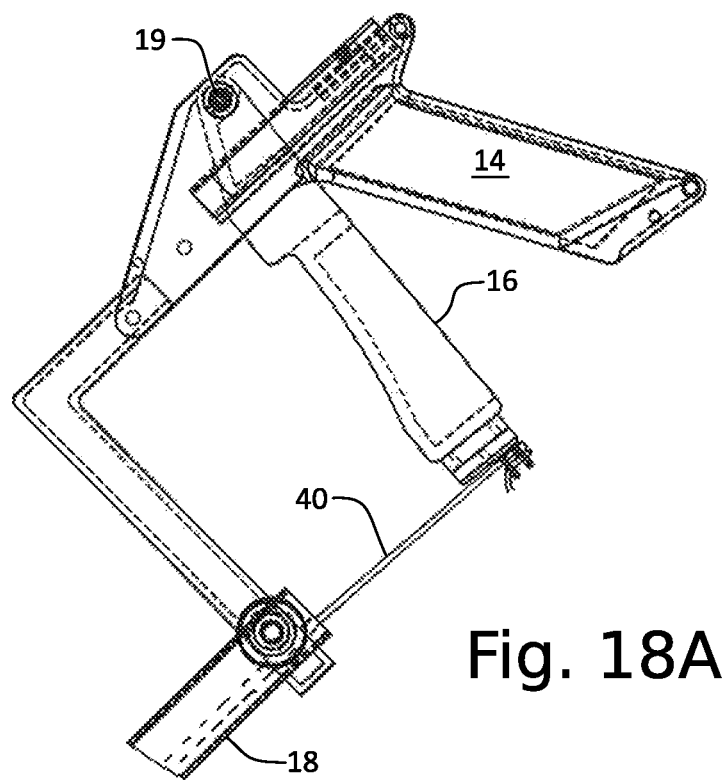

FIGS. 18A and 18B show an alternative embodiment of the applicator (12) with the handle (14) and trigger (16) in more detail. The configuration of parts shown in FIG. 18B include the trigger (16) and handle (14) and the pivot bolt (19) which connects the trigger (16) to the handle (14). The attachment of the cables (40) to the D ring (54) of the trigger (16) is also shown.

Figure 19A:
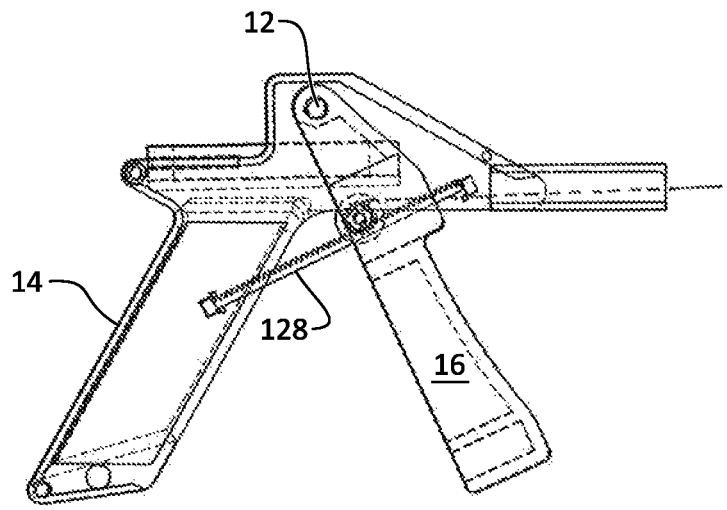
FIGS. 19A and 19B show an alternative embodiment of the handle (14) and trigger (16).
Figure 19B:
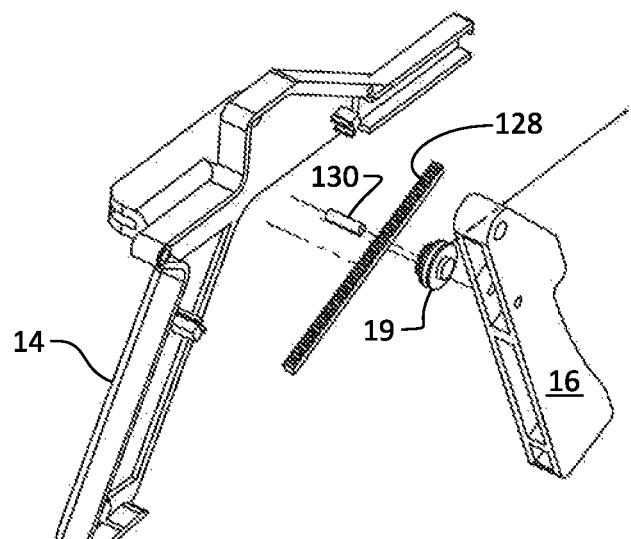
Figure 20A:
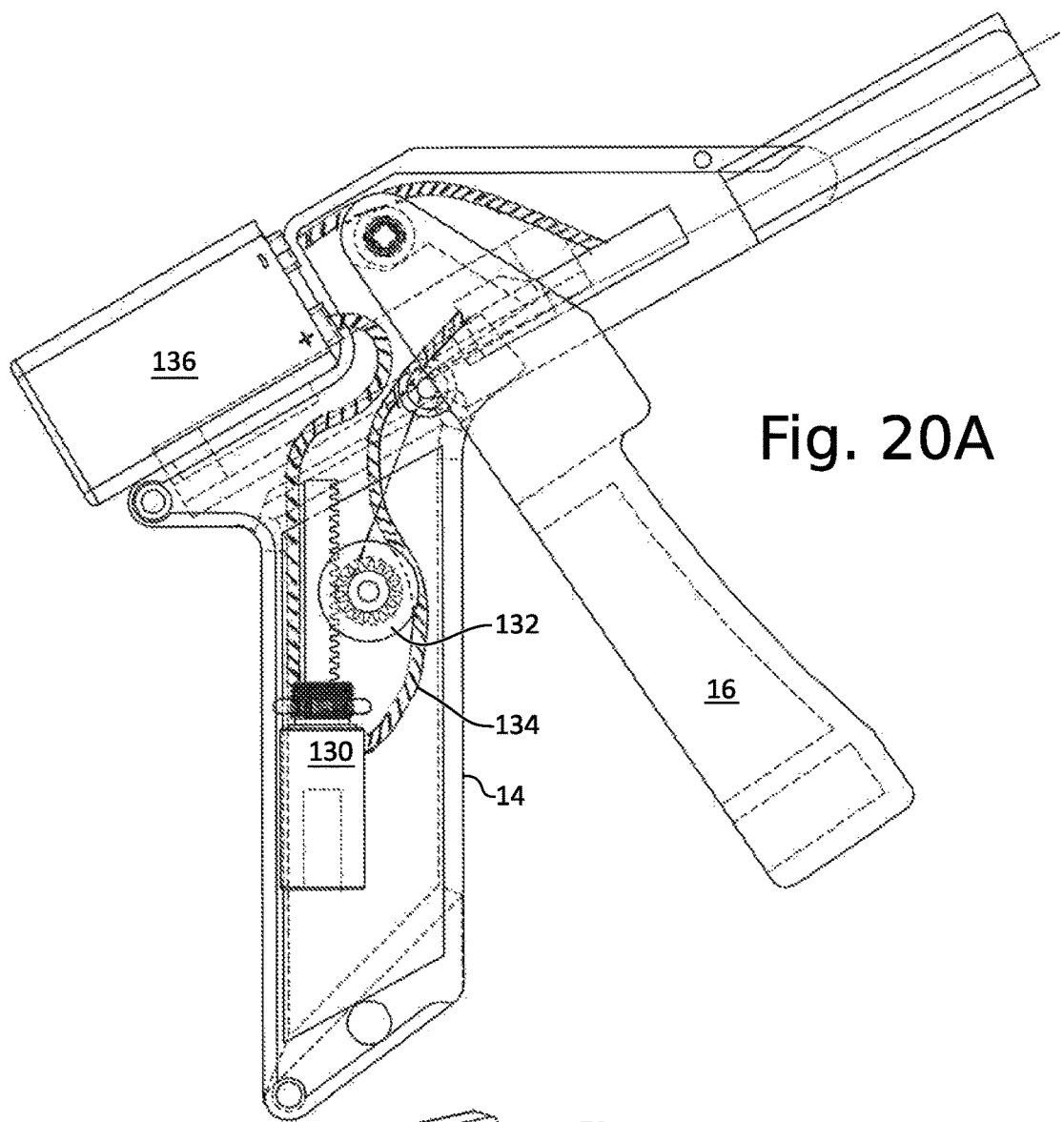
FIGS. 20A and 20B show yet another alternative embodiment handle (14) and trigger (16) of the present design.
Figure 20B:
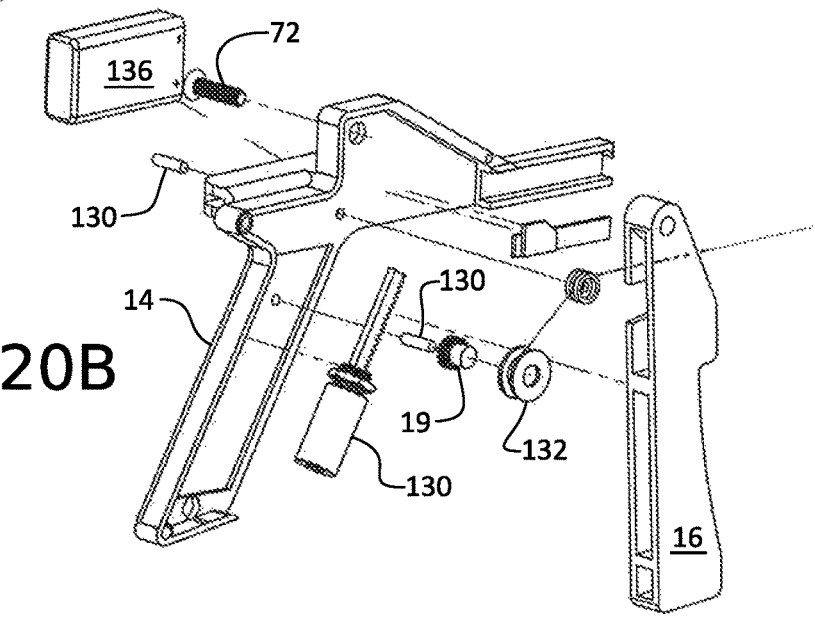

FIGS. 19A and 19B and FIGS. 20A and 20B show alternative embodiments handle (14) and trigger (16) of the present design. In FIGS. 19A and 19B show an alternative to simply the pivot bolt (19), so that when the trigger (16) is pulled, a rack (128) and pinion gear and spool (19) combination are actuated. FIGS. 20A and 20B are an embodiment in which the trigger (16) is power assisted. The power assisted version has a wire (134) extending from the battery (136) to the rack solenoid (130) to a rheostat. The rack solenoid (130) moves the pinion gear (132) and spool (19) held in place by a pin (130) when the trigger (16) is pulled thereby advancing the chord (40) to tighten the jaws (24/46 and 26/42).

Figure 21:
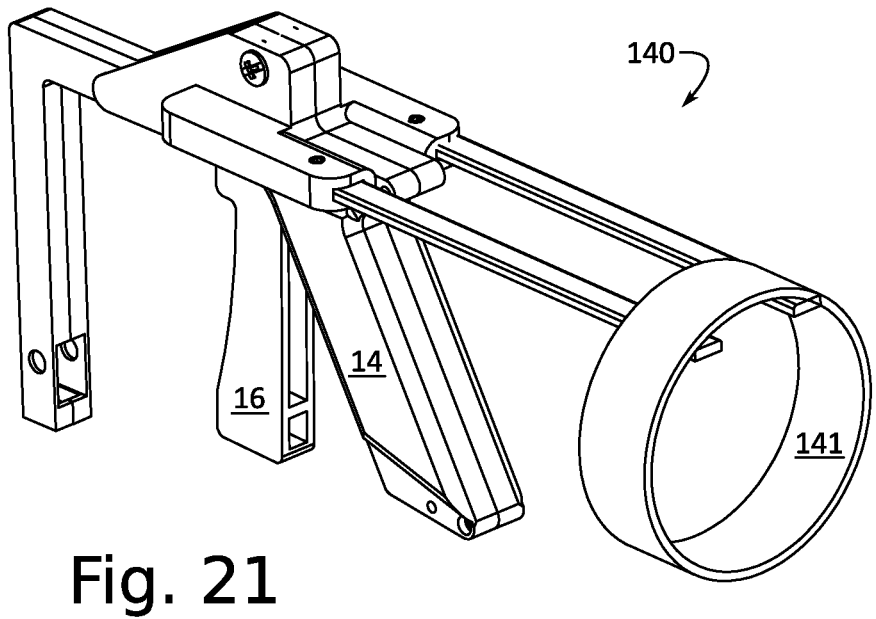
FIGS. 21 and 22 show alternative optional arm braces (140) for use with a handle (14) according to alternative embodiments of the present invention.
Figure 22:
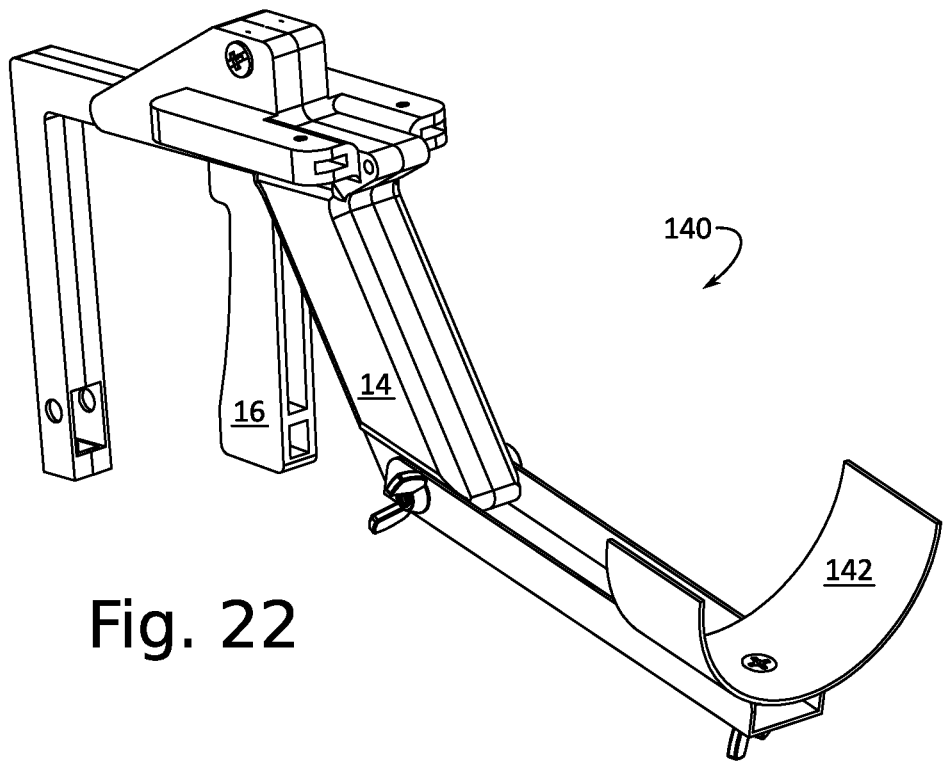

FIGS. 21 and 22 show alternative optional arm braces (140) for use with and attached to a handle (14) according to alternative embodiments of the present invention. The arm braces (140) may either extend from the top of the handle (14) as in FIG. 21, or from the bottom of the handle (14) as shown in FIG. 22. At the end of of the braces (140), are either a wrist band (141), or for the embodiment in which the arm braces (140) extend from the bottom of the handle (14), a lower wrist support (142). Alternative configurations from those shown are included herein.

Figure 23A:
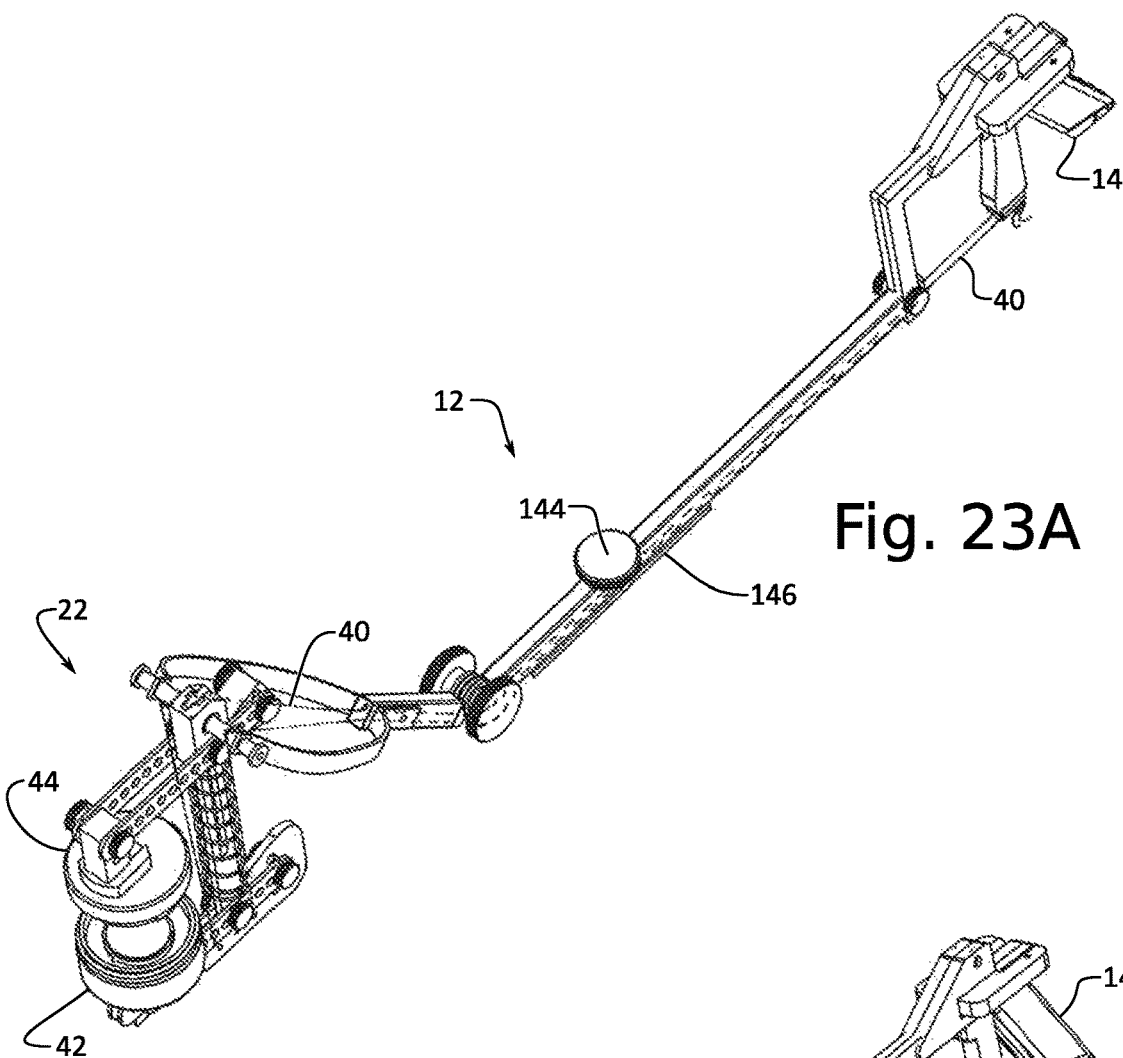
FIGS. 23A and 23B show an optional cross brace (146) used to hold the fluid applicator (12) upright when not in use or stored.
Figure 23B:
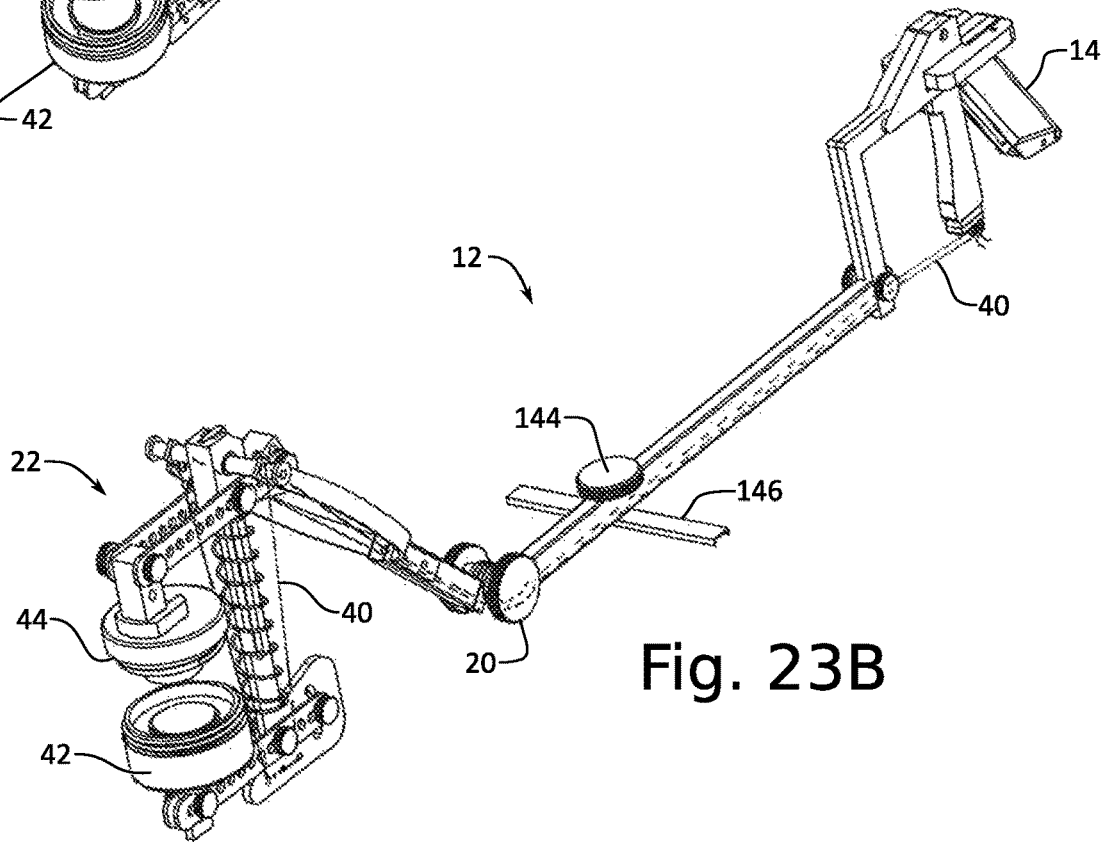

FIGS. 23A and 23B show an optional cross brace (146) that may be used to hold the fluid applicator (12) upright when not in use or stored. In operation, the cross brace (146) rotates from a stowed position, as shown in FIG. 23A, to a deployed position, as shown in FIG. 23B. A thumb bolt (144) is shown providing the pivot point about which the cross brace (146) rotates.

It is to be understood that the present invention is not limited to the embodiments described above, but encompasses any and all embodiments within the scope of the following claims.

What is claimed is:

1. A fluid applicator (12), comprising:
a pistol grip handle (14) with a trigger/lever (16);
a hollow tube (18) with an articulating shaft joint (20);
an operative portion (22) with a set of opposing, vertically held upper and lower jaws (24 and 26) which are separated; and
a cable cord (40) extending from the trigger/lever (16) through the hollow tube (18) to the operative portion (22);
the operative portion (22) further comprising,
a container (28 or 42) disposed on the lower jaw (26), and
a lid (30 or 46) or second container (28) disposed on the upper jaw (24), wherein,
the container (28 or 42) has a primary sponge (43), a primary roller (116), or a paste cake (124) disposed within and extending from the container (28 or 42), and
an upper sponge (50), or a primary roller, disposed within and extending from the lid (30 or 42), or a second container (28) with a paste cake (124) disposed within and extending therefrom;
squeezing the trigger/lever (16) causes either of the jaws (24 or 26), or both of the jaws (24 and 26), to advance towards the other jaw (24 and/or 26).

2. The fluid applicator (12) of claim 1, wherein:
the hollow tube (18) has an articulating shaft joint (20) between the operative portion (22) and the pistol grip handle (14).

3. The fluid applicator (12) of claim 1, wherein:
the hollow tube (18) has a cross brace (146) between the operative portion (22) and the pistol grip handle (14) wherein the cross brace (146) pivots from stowed to deployed for resting the applicator (12) upright when not in use.

4. The fluid applicator (12) of claim 1, wherein:
the operative portion (22) is attached to the hollow tube (18) by a set of band springs (34).

5. The fluid applicator (12) of claim 4, wherein:
the operative portion (22) has a double cable/cords (40) extending directly from the hollow tube (18) to each side of the upper jaw (24) and down from there to the lower jaw (26), or extending partially from the hollow tube (18) as a single length and then splitting so that a single double cable/cord (40) goes to each side of the upper jaw (24) and downward to the lower jaw (26), or extending either as a single or double length of cable/cord (40) from the hollow tube (18) and then either a direct split of cable/cord (41) or an intermediate spring (39) attaches the cable/cord (41) so that a cable/cord (40) goes to each side of the upper jaw (24) and downward to the lower jaw (26), to bring the jaws (24 and 26) together upon pulling the trigger/lever (14).

6. The applicator (12) according to claim 1, wherein:
the trigger/lever (16) has an adjustable attaching point (54) for cable/cord (40) tension and separation between upper and lower jaws (24 and 26).

7. The applicator (12) according to claim 1, wherein:
the lower jaw (26) aligns parallel with the upper jaw (24) via a slotted shaft (38).

8. The applicator (12) according to claim 7, further comprising:
a spring (86) disposed on the slotted shaft (38) between the upper and lower jaws (24 and 26).

9. The applicator (12) of claim 1, wherein:
the operative portion (22) attachment to springs (34) allows for the jaws (24 and 26) to swing freely while maintaining vertical alignment.

10. The applicator (12) of claim 1, wherein:
the container (28 or 42) is a fluid reservoir that can be closed with the lid (30 or 46) for storage.

11. The applicator (12) of claim 10, wherein:
the lid (30 or 46) has a sponge attached permanently or temperately to an inside of the lid (30 or 46).

12. The applicator (12) of claim 1, wherein
the container (28 or 42) has an internal structure consisting of a removable concave/disc section (104), which houses the sponge (43), and prevents spillage by use of fill/drain holes (94 and 121), and slots (96), drain tubes (102), or both.

13. The applicator (12) of claim 1, wherein:
an O-ring (92) may be disposed between container (28 or 42) and the concave disk section (104).

14. The applicator (12) of claim 1, wherein:
the container (28 or 42) is attached to the lower jaw (26) via a slip-on shoe or sheath (56); or the attachment (44) is taken from the group consisting of hook and loop, latches, clips, magnets, double sided tape and screws, and
combinations thereof.

15. The applicator (12) of claim 1, wherein:
the pistol grip handle (14) contains a rack (128) and rack/pinion (19) to assist actuation; or the pistol grip handle (14) is power assisted with a battery (136), solenoid rack (130) pinion (132).

16. The applicator (12) of claim 1, wherein:
the lid (30 or 46) is attached to the upper jaw (24) via a slip-on shoe or sheath (56); or
the attachment (44) is taken from the group consisting of hook and loop, latches, clips, magnets, double sided tape and screws, and combinations thereof.

17. The applicator (12) of claim 1, wherein:
the hollow tube (18) is composed of a lightweight material such as an aluminum, an aluminum alloy, plastic, composite, or the like.

18. The applicator (12) of claim 1, wherein:
the container (28 or 42) and lid (30 or 46) have a spacer (90) disposed between them with a sponge (50) disposed within the lid (30 or 46) and another sponge is held by a concave cone or disk structure (104) that channels excess fluid back into the container (28 or 42) via extrusion tubes (102) and a hole (100) through which a pin (98) is pushed to secure the sponge (43) in place; wherein the tubes (102) are attached to the outside of the lid housing the sponge.

19. The applicator (12) of claim 18, further comprising:
an O-ring disposed between concave cone/disk structure (104) and the container (28 and 30) to prevent fluid from leaking when on its side.

20. A fluid applicator (12), comprising:
a pistol grip handle (14) with a trigger/lever (16);
a hollow tube (18) with an articulating shaft joint (20);
an operative portion (22) with a set of opposing, vertically held upper and lower jaws (24 and 26) which are separated; and
a cable cord (40) extending from the trigger/lever (16) through the hollow tube (18) to the operative portion (22);
the operative portion (22) further comprising,
a container (28 or 42) disposed on the lower jaw (26), and
a lid (30 or 46) or second container (28) disposed on the upper jaw (24), wherein,
the container (28 or 42) has a primary sponge (43), a primary roller (116), or a paste cake (124) disposed within and extending from the container (28 or 42), and
an upper sponge (50), or a primary roller, disposed within and extending from the lid (30 or 42), or a second container (28) with a paste cake (124) disposed within and extending therefrom;
squeezing the trigger/lever (16) causes either of the jaws (24 or 26), or both of the jaws (24 and 26), to advance towards the other jaw (24 and/or 26); wherein
the hollow tube (18) has an articulating shaft joint (20) between the operative portion (22) and the pistol grip handle (14);
the operative portion (22) is attached to the tube (18) by a set of band springs (34); and
the operative portion (22) has a double cable/cords (40) extending directly from the tube (18) to each side of the upper jaw (24) and down from there to the lower jaw (26), or extending partially from the hollow tube (18) as a single length and then splitting so that a single double cable/cord (40) goes to each side of the upper jaw (24) and downward to the lower jaw (26), or extending either as a single or double length of cable/cord (40) from the hollow tube (18) and then either a direct split of cable/cord (41) or an intermediate spring (39) attaches the cable/cord (41) so that a cable/cord (40) goes to each side of the upper jaw (24) and downward to the lower jaw (26), to
bring the jaws (24 and 26) together upon pulling the lever/trigger/lever (14).

21. A method of targeting herbicide and insecticide using an applicator (12), comprising:
providing an applicator (12) with a primary sponge (43), a primary roller (116), or a paste cake (124) to touch the underside of a leaf (S); wherein the applicator (12) comprises
a pistol grip handle (14) with a trigger/lever (16);
a hollow tube (18) with an articulating shaft joint (20);
an operative portion (22) with a set of opposing, vertically held upper and lower jaws (24 and 26) which are separated; and
a cable cord (40) extending from the trigger/lever (16) through the hollow tube (18) to the operative portion (22);
the operative portion (22) further comprising,
a container (28 or 42) disposed on the lower jaw (26), and
a lid (30 or 46) or second container (28) disposed on the upper jaw (24), wherein,
the container (28 or 42) has a primary sponge (43), a primary roller (116), or a paste cake (124) disposed within and extending from the container (28 or 42), and
an upper sponge (50), or a primary roller, disposed within and extending from the lid (30 or 42), or a second container (28) with a paste cake (124) disposed within and extending therefrom;
squeezing the trigger/lever (16) causes either of the jaws (24 or 26), or both of the jaws (24 and 26), to advance towards the other jaw (24 and/or 26); wherein
the hollow tube (18) has an articulating shaft joint (20) between the operative portion (22) and the pistol grip handle (14);
the operative portion (22) is attached to the hollow tube (18) by a set of band springs (34); and
the operative portion (22) has a double cable/cords (40) extending directly from the hollow tube (18) to each side of the upper jaw (24) and down from there to the lower jaw (26), or extending partially from the hollow tube (18) as a single length and then splitting so that a single double cable/cord (40) goes to each side of the upper jaw (24) and downward to the lower jaw (26), or extending either as a single or double length of cable/cord (40) from the hollow tube (18) and then either a direct split of cable/cord (41) or an intermediate spring (39) attaches the cable/cord (41) so that a cable/cord (40) goes to each side of the upper jaw (24) and downward to the lower jaw (26), to bring the jaws (24 and 26) together upon pulling the trigger/lever (14).

* * * * *